US012548510B2

United States Patent

(12) United States Patent
Lim et al.

(10) Patent No.: US 12,548,510 B2
(45) Date of Patent: Feb. 10, 2026

(54) SUB-PIXEL AND DISPLAY DEVICE INCLUDING THE SAME

(71) Applicant: Samsung Display Co., Ltd., Yongin-Si (KR)

(72) Inventors: Jae Keun Lim, Yongin-si (KR); Bon Seog Gu, Yongin-si (KR); Ji Youn Kim, Yongin-si (KR); Hyun Joon Kim, Yongin-si (KR); Jin Young Roh, Yongin-si (KR); Hae Kwan Seo, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/744,921

(22) Filed: Jun. 17, 2024

(65) Prior Publication Data

US 2025/0118254 A1 Apr. 10, 2025

(30) Foreign Application Priority Data

Oct. 10, 2023 (KR) ........................ 10-2023-0134666

(51) Int. Cl.
*G09G 3/3233* (2016.01)

(52) U.S. Cl.
CPC ... *G09G 3/3233* (2013.01); *G09G 2300/0819* (2013.01); *G09G 2300/0852* (2013.01); *G09G 2300/0861* (2013.01); *G09G 2310/08* (2013.01); *G09G 2330/021* (2013.01)

(58) Field of Classification Search
None
See application file for complete search history.

(56) References Cited

U.S. PATENT DOCUMENTS

| | | | | |
|---|---|---|---|---|
| 7,564,433 B2 | 7/2009 | Hector et al. | | |
| 8,004,477 B2 | 8/2011 | Uchino et al. | | |
| 2006/0077134 A1* | 4/2006 | Hector | G09G 3/3233 | 345/76 |
| 2013/0063041 A1* | 3/2013 | Kimura | H10D 86/441 | 315/291 |
| 2013/0088417 A1* | 4/2013 | Kim | G09G 3/3225 | 345/82 |

(Continued)

FOREIGN PATENT DOCUMENTS

| | | |
|---|---|---|
| CN | 103325335 B | 9/2015 |
| KR | 10-20070051748 A | 5/2007 |
| KR | 10-2508261 B1 | 3/2023 |

OTHER PUBLICATIONS

European search report dated Feb. 21, 2025, for related European Application No. 24205595.2, 15 pages.

*Primary Examiner* — Dorothy Harris
(74) *Attorney, Agent, or Firm* — Innovation Counsel LLP

(57) ABSTRACT

A sub-pixel may include a first transistor configured to generate a driving current, a first capacitor including a first electrode connected to a first electrode of the first transistor, and a second electrode, a second capacitor including a first electrode connected to a control electrode of the first transistor, and a second electrode connected to the second electrode of the first capacitor, a second transistor configured to provide a data voltage to the second electrode of the first capacitor in response to a write gate signal, and a light emitting element configured to receive the driving current and emit light.

12 Claims, 30 Drawing Sheets

(56) References Cited

U.S. PATENT DOCUMENTS

| | | | | |
|---|---|---|---|---|
| 2015/0109278 | A1* | 4/2015 | Kim | G09G 3/3233<br>345/82 |
| 2022/0270542 | A1* | 8/2022 | Park | G09G 3/3233 |
| 2023/0252935 | A1* | 8/2023 | Park | G09G 3/3233<br>345/55 |
| 2023/0395030 | A1* | 12/2023 | Kim | G09G 3/3233 |

* cited by examiner

SUB-PIXEL AND DISPLAY DEVICE INCLUDING THE SAME

CROSS-REFERENCE TO RELATED APPLICATION

The present application claims priority to Korean patent application number 10-2023-0134666 filed on Oct. 10, 2023, the entire disclosure of which is incorporated herein in its entirety by reference.

BACKGROUND

Field

Various embodiments of the present disclosure relate to a pixel and a display device including the sub-pixel.

Description of Related Art

Generally, display devices may include a display panel, a gate driver, a data driver, and a driving controller. The display panel may include a plurality of gate lines, a plurality of data lines, and a plurality of sub-pixels electrically connected to the gate lines and the data lines. The gate driver may provide gate signals to the gate lines. The data driver may provide data voltages to the data lines. The driving controller may control the gate driver and the data driver.

Recently, display devices that provide virtual reality (VR) or augmented reality (AR) have been gaining prominence. Hence, there is a demand for display devices with a low surface area and high pixels per inch (ppi).

To achieve a low surface area and high ppi, the display devices may be designed such that components are integrated in minimized surface area. However, in design processes, there are limitations to integration of some components with a minimum width required to meet design rules in a small surface area.

Therefore, there is a growing need to minimize transistors that form sub-pixels and integrate the transistors in a smallest surface area.

SUMMARY

Various embodiments of the present disclosure are directed to a sub-pixel capable of minimizing voltage distribution due to capacitors in writing a data voltage.

Various embodiments of the present disclosure are directed to a display device including the sub-pixel.

An embodiment of the present disclosure may provide a sub-pixel, including: a first transistor configured to generate a driving current; a first capacitor including a first electrode connected to a first electrode of the first transistor, and a second electrode; a second capacitor including a first electrode connected to a control electrode of the first transistor, and a second electrode connected to the second electrode of the first capacitor; a second transistor configured to provide a data voltage to the second electrode of the first capacitor in response to a write gate signal; and a light emitting element configured to receive the driving current and emit light.

In an embodiment, the sub-pixel may further include: a third transistor configured to connect the first electrode of the first transistor to the second electrode of the first capacitor in response to a reference gate signal; and a fourth transistor configured to provide a reference voltage to the control electrode of the first transistor in response to the reference gate signal.

In an embodiment, the sub-pixel may further include a fifth transistor configured to provide an initialization voltage to a first electrode of the light emitting element in response to an initialization gate signal.

In an embodiment, each of the reference gate signal and the initialization gate signal may have an enable level during an initialization period. The reference gate signal has the enable level during a compensation period following the initialization period in one frame. Each of the initialization gate signal and the write gate signal may have the enable level during an addressing period following the compensation period in one frame. The initialization gate signal may have the enable level during an emission initialization period following the addressing period in one frame.

In an embodiment, the sub-pixel may further include a sixth transistor configured to provide a first power voltage to the first transistor in response to an emission signal.

In an embodiment, each of the reference gate signal and the initialization gate signal may have an enable level during an initialization period. Each of the reference gate signal and the emission signal may have the enable level during a compensation period following the initialization period in one frame. Each of the initialization gate signal and the write gate signal may have the enable level during an addressing period following the compensation period in one frame. The initialization gate signal may have the enable level during an emission initialization period following the addressing period in one frame.

In an embodiment, the sub-pixel may further include a seventh transistor configured to connect the first electrode of the first transistor to the first electrode of the light emitting element in response to an emission bias signal.

In an embodiment, the sub-pixel may further include an eighth transistor configured to provide the reference voltage to the first electrode of the first transistor in response to the write gate signal.

In an embodiment, each of the reference gate signal and the initialization gate signal may have an enable level during an initialization period. Each of the reference gate signal and the emission signal may have the enable level during a compensation period following the initialization period in one frame. The write gate signal may have the enable level during an addressing period following the compensation period in one frame. The initialization gate signal may have the enable level during an emission initialization period following the addressing period in one frame.

In an embodiment, the sub-pixel may further include a seventh transistor configured to connect the first electrode of the first transistor to the first electrode of the light emitting element in response to an emission bias signal.

In an embodiment, the sub-pixel may further include a ninth transistor configured to provide the first power voltage to the first transistor in response to the reference gate signal.

In an embodiment, the initialization gate signal may have an enable level during a first compensation initialization period. The reference gate signal may have the enable level during a second compensation initialization period. Each of the initialization gate signal and the write gate signal may have the enable level during an addressing period following the first compensation initialization period and the second compensation initialization period in one frame. The initialization gate signal may have the enable level during an emission initialization period following the addressing period.

In an embodiment, the first compensation initialization period and the second compensation initialization period may be alternately arranged.

In an embodiment, the sub-pixel may further include a seventh transistor configured to connect the first electrode of the first transistor to the first electrode of the light emitting element in response to a preceding emission signal.

In an embodiment, the sub-pixel may further include an eighth transistor configured to provide the reference voltage to the first electrode of the first transistor in response to the write gate signal.

In an embodiment, the initialization gate signal may have an enable level during a first compensation initialization period. The reference gate signal may have the enable level during a second compensation initialization period. The write gate signal may have the enable level during an addressing period following the first compensation initialization period and the second compensation initialization period in one frame. The initialization gate signal may have the enable level during an emission initialization period following the addressing period.

In an embodiment, the sub-pixel may further include a seventh transistor configured to connect the first electrode of the first transistor to the first electrode of the light emitting element in response to a preceding emission signal.

In an embodiment, the sub-pixel may further include: a sixth transistor configured to provide a 1-1-th power voltage to the first transistor in response to an emission signal; and a ninth transistor configured to provide a 1-2-th power voltage to the first transistor in response to the reference gate signal.

In an embodiment, the sub-pixel may further include an eighth transistor configured to provide the reference voltage to the first electrode of the first transistor in response to the write gate signal.

In an embodiment, the sub-pixel may further include: a fifth transistor configured to provide an initialization voltage to the first electrode of the first transistor in response to an initialization gate signal; a sixth transistor configured to provide a first power voltage to the first transistor in response to an emission signal; and a seventh transistor configured to connect the first electrode of the first transistor to a first electrode of the light emitting element in response to an emission bias signal.

In an embodiment, each of the reference gate signal and the initialization gate signal may have an enable level during an initialization period. Each of the reference gate signal and the emission signal may have the enable level during a compensation period following the initialization period in one frame. Each of the initialization gate signal, the write gate signal, and the emission bias signal may have the enable level during an addressing period following the compensation period in one frame. Each of the initialization gate signal and the emission bias signal may have the enable level during an emission initialization period following the addressing period in one frame.

In an embodiment, the sub-pixel may further include an eighth transistor configured to provide the reference voltage to the first electrode of the first transistor in response to the write gate signal.

In an embodiment, each of the reference gate signal and the initialization gate signal may have an enable level during an initialization period. Each of the reference gate signal and the emission signal may have the enable level during a compensation period following the initialization period in one frame. The write gate signal may have the enable level during an addressing period following the compensation period in one frame. Each of the initialization gate signal and the emission bias signal may have the enable level during an emission initialization period following the addressing period in one frame.

In an embodiment, the sub-pixel may include: a fifth transistor configured to provide an initialization voltage to the first electrode of the first transistor in response to an initialization gate signal; a sixth transistor configured to provide a first power voltage to the first transistor in response to an emission signal; a seventh transistor configured to connect the first electrode of the first transistor to a first electrode of the light emitting element in response to a preceding emission signal; and a ninth transistor configured to provide the first power voltage to the first transistor in response to the reference gate signal.

In an embodiment, the initialization gate signal may have an enable level during a first compensation initialization period. The reference gate signal may have the enable level during a second compensation initialization period. Each of the initialization gate signal, the write gate signal, and the preceding emission signal may have the enable level during an addressing period following the first compensation initialization period and the second compensation initialization period. Each of the initialization gate signal and the preceding emission signal may have the enable level during an emission initialization period following the addressing period.

In an embodiment, the sub-pixel may further include an eighth transistor configured to provide the reference voltage to the first electrode of the first transistor in response to the write gate signal.

In an embodiment, the initialization gate signal may have an enable level during a first compensation initialization period. The reference gate signal may have the enable level during a second compensation initialization period. The write gate signal may have the enable level during an addressing period following the first compensation initialization period and the second compensation initialization period in one frame. Each of the initialization gate signal and the preceding emission signal may have the enable level during an emission initialization period following the addressing period.

An embodiment of the present disclosure may provide a display device, including: a display panel including a sub-pixel; and a display panel driver configured to drive the display panel. The sub-pixel may include: a first transistor configured to generate a driving current; a first capacitor including a first electrode connected to a first electrode of the first transistor, and a second electrode; a second capacitor including a first electrode connected to a control electrode of the first transistor, and a second electrode connected to the second electrode of the first capacitor; a second transistor configured to provide a data voltage to the second electrode of the first capacitor in response to a write gate signal; and a light emitting element configured to receive the driving current and emit light.

DETAILED DESCRIPTION

Figure 1:
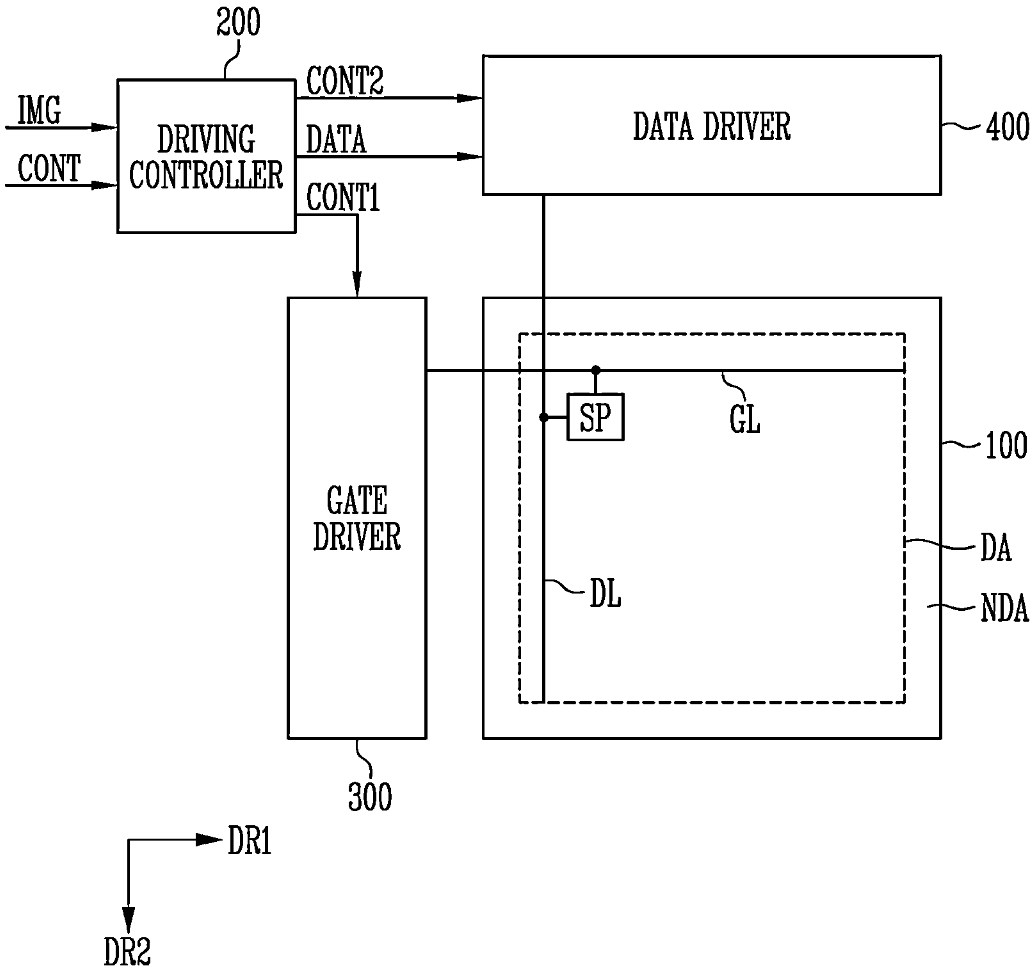
FIG. 1 is a block diagram illustrating a display device in accordance with embodiments of the present disclosure.

Hereinafter, embodiments will be described in detail with reference to the attached drawings. In the following description, only parts required for understanding of operations in accordance with the present disclosure will be described, and explanation of the other parts will be omitted not to make the gist of the present disclosure unclear. Accordingly, the present disclosure is not limited to the embodiments set forth herein but may be embodied in other types. Rather, these embodiments are provided so that the present disclosure will be thorough and complete, and will fully convey the technical spirit of the disclosure to those skilled in the art.

It will be understood that when an element is referred to as being "coupled" or "connected" to another element, it can be directly coupled or connected to the other element or intervening elements may be present therebetween. The terminology used herein is for the purpose of describing particular embodiments only and is not intended to be limiting. In the specification, when an element is referred to as "comprising" or "including" a component, it does not preclude another component but may further include other components unless the context clearly indicates otherwise. "at least one of X, Y, and Z" and "at least one selected from the group consisting of X, Y, and Z" may be construed as X only, Y only, Z only, or any combination of two or more of X, Y, and Z (for instance, XYZ, XYY, YZ, and ZZ). As used herein, the term "and/or" can include any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one element or feature's relationship to another element(s) or feature(s), as illustrated in the drawings. Spatially relative terms are intended to encompass different orientations of an apparatus in use, operation, and/or manufacture in addition to the orientation depicted in the drawings. For example, if the device in the drawings is turned upside down, elements described as "below" or "beneath" other elements or features would then be oriented "above" the other elements or features. Thus, the term "below" can encompass both an orientation of above and below. Furthermore, the device may be otherwise oriented (e.g., rotated 90 degrees or at other orientations), and, as such, the spatially relative descriptors used herein interpreted accordingly.

Various embodiments will be described with reference to diagrams illustrating idealized embodiments. As such, variations from the shapes of the illustrations as a result, for example, of manufacturing techniques and/or tolerances, are to be expected. Therefore, embodiments disclosed herein should not be construed as limited to the particular illustrated shapes of regions, but are to include deviations in shapes that result from, for instance, manufacturing. As such, the shapes illustrated in the drawings may not illustrate the actual shapes of regions of a device, and, as such, are not intended to be limiting.

FIG. 1 is a block diagram illustrating a display device in accordance with embodiments of the present disclosure.

Referring to FIG. 1, the display device may include a display panel 100 and a display panel driver. The display panel driver may include a driving controller 200, a gate driver 300, and a data driver 400. In an embodiment, the driving controller 200 and the data driver 400 may be integrated into a single chip.

The display panel 100 may include a display area DA formed to display an image, and a non-display area NDA disposed adjacent to the display area DA. In an embodiment, the gate driver 300 may be mounted in the non-display area NDA.

The display panel 100 may include a plurality of gate lines GL, a plurality of data lines DL, and a plurality of sub-pixels SP electrically connected to the gate lines GL and the data lines DL. The gate lines GL may extend in a first direction DR1. The data lines DL may extend in a second direction DR2 that intersects with the first direction DR1.

The driving controller 200 may receive input image data IMG and an input control signal CONT from a main processor, e.g., a graphic processing unit (GPU). For example, the input image data IMG may include red image data, green image data, and blue image data. In an embodiment, the input image data IMG may further include white image data. In another example, the input image data IMG may include magenta image data, yellow image data, and cyan image data. The input control signal CONT may include a master clock signal and a data enable signal. The input control signal CONT may include a vertical synchronization signal and a horizontal synchronization signal.

The driving controller 200 may generate a first control signal CONT1, a second control signal CONT2, and a data signal DATA, based on the input image data IMG and the input control signal CONT.

The driving controller 200 may generate the first control signal CONT1 for controlling the operation of the gate driver 300 based on the input control signal CONT and output the first control signal CONT1 to the gate driver 300. The first control signal CONT1 may include a vertical start signal and a gate clock signal.

The driving controller 200 may generate the second control signal CONT2 for controlling the operation of the date driver 400 based on the input control signal CONT, and output the second control signal CONT2 to the gate driver 400. The second control signal CONT2 may include a horizontal start signal and a load signal.

The driving controller 200 may receive the input image data IMG and the input control signal CONT and generate the data signal DATA. The driving controller 200 may output the data signal DATA to the data driver 400.

The gate driver 300 may generate gate signals for driving the gate lines GL in response to the first control signal CONT1 received from the driving controller 200. The gate driver 300 may output the gate signals to the gate lines GL. For example, the gate driver 300 may sequentially output the gate signals to the gate lines GL.

The data driver 400 may receive the second control signal CONT2 and the data signal DATA from the driving controller 200. The data driver 400 may generate data voltages by converting the data signal DATA into analog voltages. The data driver 400 may output the data voltages to the data lines DL.

Figure 2:
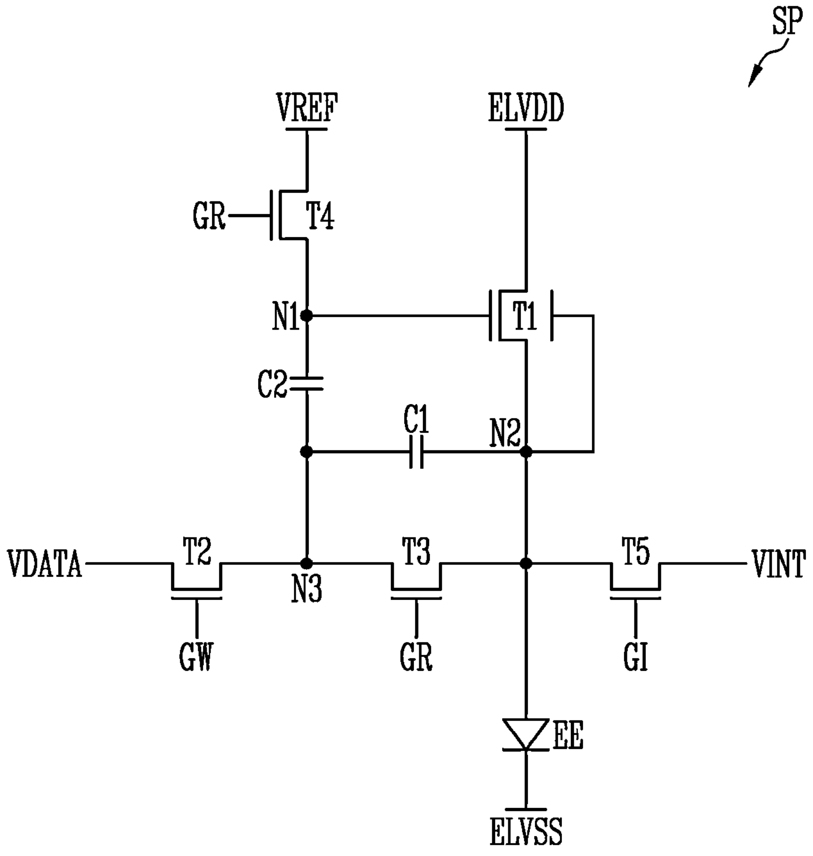
FIG. 2 is a circuit diagram illustrating an example of a sub-pixel of the display device of FIG. 1.
Figure 3:
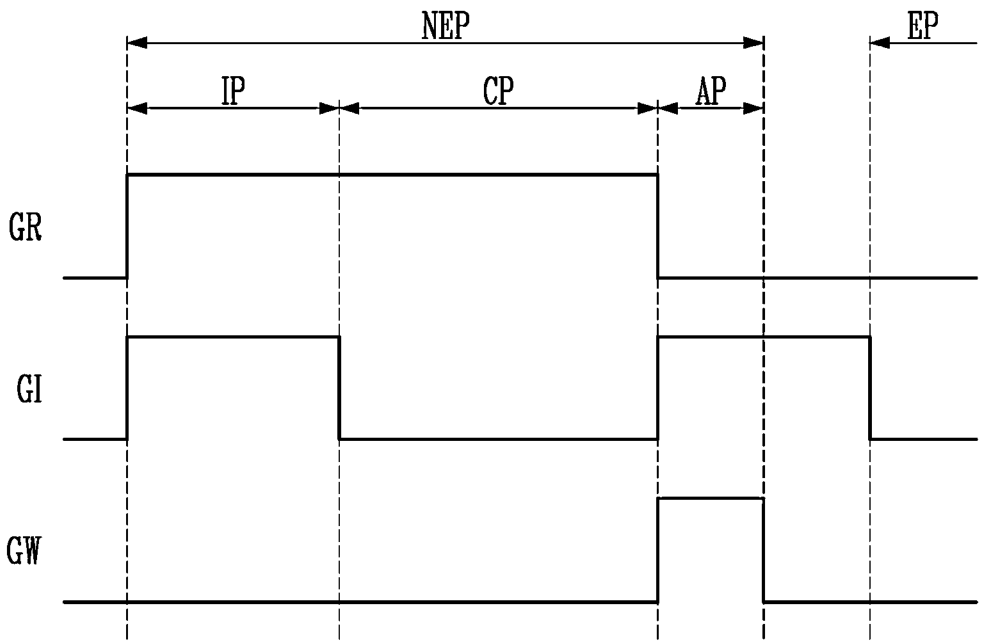
FIG. 3 is a timing diagram illustrating an example of driving the sub-pixel during a non-emission period in the display device of FIG. 1.
Figure 4:
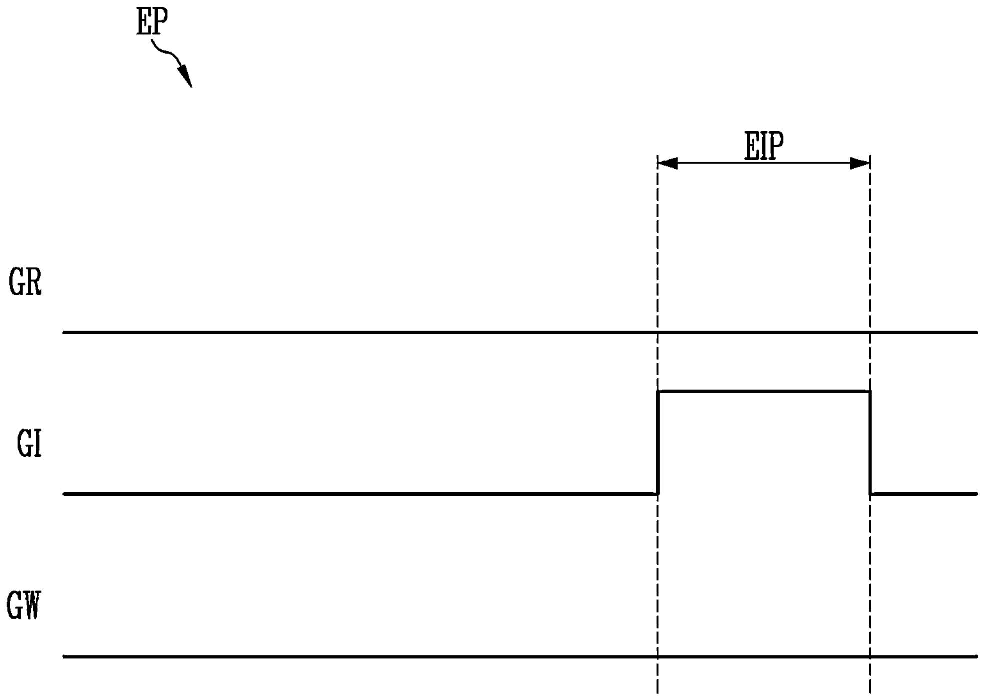
FIG. 4 is a timing diagram illustrating an example of driving the sub-pixel during an emission period in the display device of FIG. 1.

FIG. 2 is a circuit diagram illustrating an example of a sub-pixel SP of the display device of FIG. 1. FIG. 3 is a timing diagram illustrating an example of driving the sub-pixel SP during a non-emission period in the display device of FIG. 1. FIG. 4 is a timing diagram illustrating an example of driving the sub-pixel SP during an emission period in the display device of FIG. 1.

Referring to FIG. 2, the sub-pixel SP may include a first transistor T1 (e.g., a driving transistor), a first capacitor C1, a second capacitor C2, a second transistor T2, and a light emitting element EE. The first transistor T1 may generate driving current. The first capacitor C1 may include a first electrode connected to a first electrode of the first transistor T1, and a second electrode. The second capacitor C2 may include a first electrode connected to a control electrode of the first transistor T1, and a second electrode connected to the second electrode of the first capacitor C1. The second transistor T2 may provide a data voltage VDATA to the second electrode of the first capacitor in response to a write gate signal GW. The light emitting element EE may receive the driving current and emit light. The sub-pixel SP may include a third transistor T3 configured to connect the first electrode of the first transistor T1 to the second electrode of the first capacitor C1 in response to a reference gate signal GR, and a fourth transistor T4 configured to provide a reference voltage VREF to the control electrode of the first transistor T1 in response to the reference gate signal GR. The sub-pixel SP may further include a fifth transistor T5 configured to provide an initialization voltage VINT to a first electrode of the light emitting element EE in response to an initialization gate signal GI.

For example, the first transistor T1 may include a control electrode connected to a first node N1, a first electrode connected to a second node N2, and a second electrode configured to receive a first power voltage ELVDD (e.g., a high power voltage). The second transistor T2 may include a control electrode configured to receive the write gate signal GW, a first electrode configured to receive the data voltage VDATA, and a second electrode connected to a third node N3. The third transistor T3 may include a control electrode configured to receive the reference gate signal GR, a first electrode connected to the second node N2, and a second electrode connected to the third node N3. The fourth transistor T4 may include a control electrode configured to receive the reference gate signal GR, a first electrode configured to receive the reference voltage VREF, and a second electrode connected to the first node N1. The fifth transistor T5 may include a control electrode configured to receive the initialization gate signal GI, a first electrode configured to receive the initialization voltage VINT, and a second electrode connected to the second node N2. The first capacitor C1 may include a first electrode connected to the second node N2, and a second electrode connected to the third node N3. The second capacitor C2 may include a first electrode connected to the first node N1, and a second electrode connected to the third node N3. The light emitting element EE may include a first electrode (e.g., an anode electrode) connected to the second node N2, and a second electrode configured to receive a second power supply ELVSS (e.g., a low power voltage).

In an embodiment, the first transistor T1 may further include a back gate electrode connected to the second node N2. However, the present disclosure is not limited to the aforementioned example.

Each of the first to fifth transistors T1 to T5 may be implemented using an n-channel metal oxide semiconductor (NMOS) transistor. In this case, a low voltage level may be a disable level, and a high voltage level may be an enable level. For example, if a signal applied to the control electrode of the NMOS transistor has a low voltage level, the NMOS transistor may be turned off. For example, if a signal applied to the control electrode of the NMOS transistor has a high voltage level, the NMOS transistor may be turned on.

However, the present disclosure is not limited to the aforementioned example. For example, each of the first to fifth transistors T1 to T5 may be implemented using a p-channel metal oxide semiconductor (PMOS) transistor. In this case, a low voltage level may be an enable level, and a high voltage level may be a disable level. For example, if a signal applied to a control electrode of the PMOS transistor has a low voltage level, the PMOS transistor may be turned on. For example, if a signal applied to the control electrode of the PMOS transistor has a high voltage level, the PMOS transistor may be turned off. In other words, the enable level and the disable level may be determined based on the type of transistor.

Referring to FIGS. 2 to 4, one frame may include a non-emission period NEP and an emission period EP. For example, the light emitting element EE may emit light during the emission period EP.

The non-emission period NEP may include an initialization period IP, a compensation period CP, and an addressing period AP. The emission period EP may include an emission initialization period EIP.

For example, in the initialization period IP, each of the reference gate signal GR and the initialization gate signal GI may have an enable level, and the third to fifth transistors T3 to T5 may be turned on. Hence, the voltage of the first node N1 may be VREF, and the voltage of each of the second and third nodes N2 and N3 may be VINT. In other words, the first and second capacitors C1 and C2 may be initialized. Here, VREF denotes a reference voltage VREF, and VINT denotes an initialization voltage VINT, and this remains the same below.

For example, in one frame, during the compensation period CP following the initialization period IP, the reference gate signal GR may have an enable level, and the third and fourth transistors T3 and T4 may be turned on. Hence, the voltage of the first node N1 may be VREF, and the voltage of each of the second and third nodes N2 and N3 may be VREF−VTH. In other words, because a voltage corresponding to VREF−VTH is stored in the first and second capacitors C1 and C2, the threshold voltage of the first transistor T1 may be compensated for during the emission period EP to be described below. Here, VTH denotes the threshold voltage of the first transistor T1, and this remains the same below.

For example, in one frame, during the addressing period AP following the initialization period IP, each of the initialization gate signal GI and the write gate signal GW may have an enable level, and the second and fifth transistors T2 and T5 may be turned on. Hence, the voltage of the first node N1 may be VDATA+VTH, the voltage of the second node N2 may be VINT, and the voltage of the third node N3 may be VDATA. In other words, the data voltage VDATA may be written to the first and second capacitors C1 and C2. Here, VDATA denotes a data voltage VDATA, and this remains the same below.

For example, during the emission period EP, the first transistor T1 may generate driving current corresponding to a gate-source voltage (i.e., a voltage between the first node N1 and the second node N2). The gate-source voltage of the first transistor T1 may be VDATA−VINT+VTH.

In the case where a reduced data voltage, e.g., (1-$\alpha$) *VDATA, where $\alpha$ is a real number less than 1 and greater than 0, a higher data voltage needs to be written to emit light with the same luminance. As the data voltage VDATA increases, power consumption of the display device may also increase. However, in the sub-pixel SP in accordance with embodiments of the present disclosure, the unaltered data voltage VDATA rather than the reduced data voltage is written. Hence, a range of the data voltage VDATA applied to the sub-pixel SP may be reduced, and the power consumption of the display device including the sub-pixel SP may be reduced.

For example, in one frame, during the emission initialization period EIP following the addressing period AP, the initialization gate signal GI may have an enable level, and the fifth transistor T5 may be turned on. In other words, the voltage of the second node N2 may be initialized.

Figure 5:
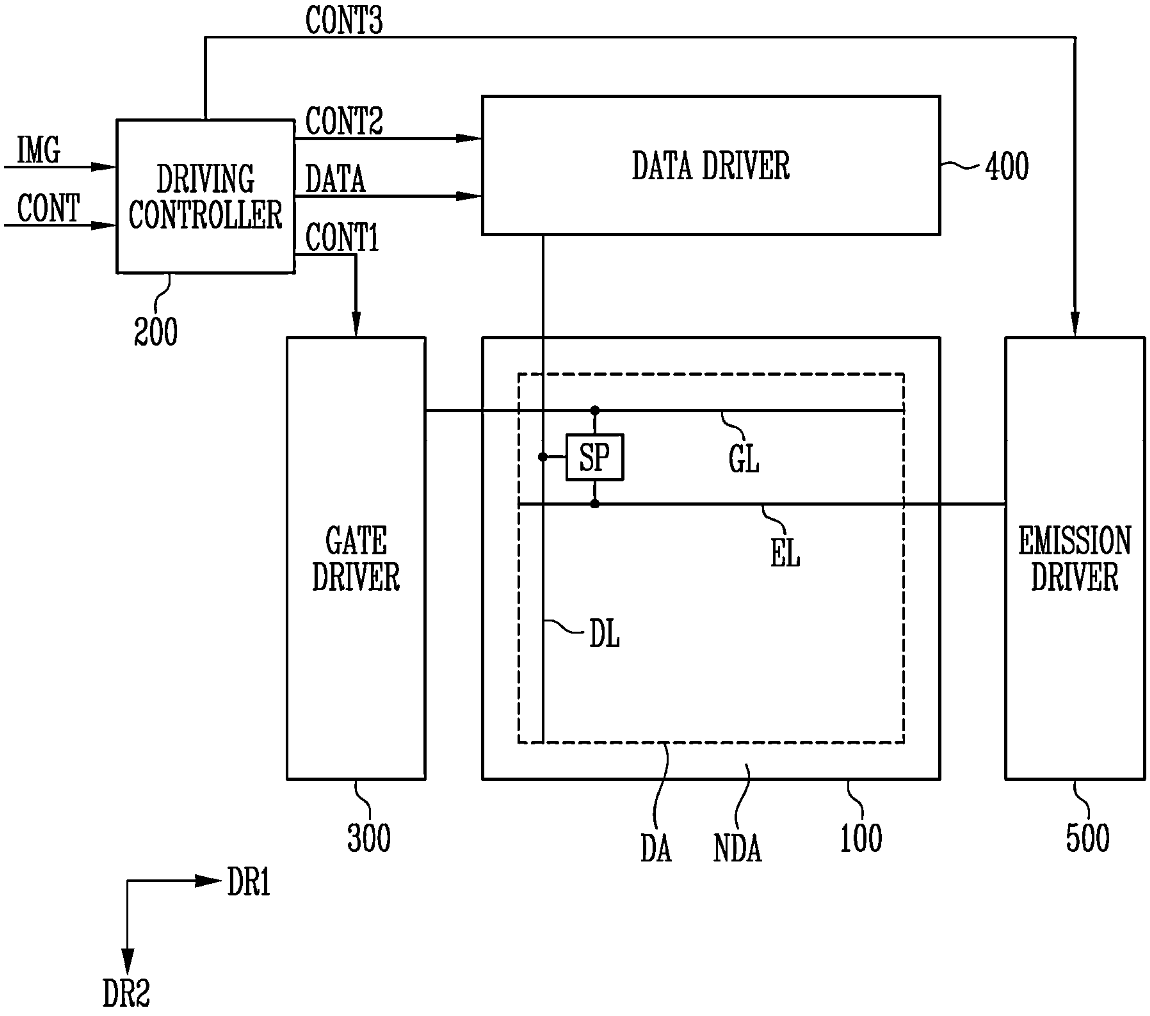
FIG. 5 is a block diagram illustrating a display device in accordance with embodiments of the present disclosure.

FIG. 5 is a block diagram illustrating a display device in accordance with embodiments of the present disclosure.

The configuration of the display device in accordance with the present embodiments is substantially the same as that of the display device of FIG. 1, other than an emission driver 500 and the sub-pixel SP; therefore, identical or similar components are denoted by the same reference numerals and symbols, and redundant explanation thereof will be omitted.

Referring to FIG. 5, the display device may include a display panel 100 and a display panel driver. The display panel driver may include a driving controller 200, a gate driver 300, a data driver 400, and the emission driver 500. In an embodiment, the driving controller 200 and the data driver 400 may be integrated into a single chip.

The display panel 100 may include a display area DA formed to display an image, and a non-display area NDA disposed adjacent to the display area DA. In an embodiment, the gate driver 300 and the emission driver 500 may be mounted in the non-display area NDA.

The display panel 100 may include a plurality of gate lines GL, a plurality of data lines DL, and a plurality of emission lines EL, and a plurality of sub-pixels SP electrically connected to the gate lines GL, the data lines DL, and the emission lines EL. The gate lines GL and the emission lines EL may extend in a first direction DR1. The data lines DL may extend in a second direction DR2 that intersects with the first direction DR1.

The driving controller 200 may receive input image data IMG and an input control signal CONT from a main processor, e.g., a graphic processing unit (GPU). For example, the input image data IMG may include red image data, green image data, and blue image data. In an embodiment, the input image data IMG may further include white image data. In another example, the input image data IMG may include magenta image data, yellow image data, and cyan image data. The input control signal CONT may include a master clock signal and a data enable signal. The input control signal CONT may include a vertical synchronization signal and a horizontal synchronization signal.

The driving controller 200 may generate a first control signal CONT1, a second control signal CONT2, a third control signal CONT3, and a data signal DATA, based on the input image data IMG and the input control signal CONT.

The driving controller 200 may generate the first control signal CONT1 for controlling the operation of the gate driver 300 based on the input control signal CONT and output the first control signal CONT1 to the gate driver 300. The first control signal CONT1 may include a vertical start signal and a gate clock signal.

The driving controller 200 may generate the second control signal CONT2 for controlling the operation of the date driver 400 based on the input control signal CONT, and output the second control signal CONT2 to the gate driver 400. The second control signal CONT2 may include a horizontal start signal and a load signal.

The driving controller 200 may receive the input image data IMG and the input control signal CONT and generate the data signal DATA. The driving controller 200 may output the data signal DATA to the data driver 400.

The driving controller 200 may generate the third control signal CONT3 for controlling the operation of the emission driver 500 based on the input control signal CONT and output the third control signal CONT3 to the emission driver 500. The third control signal CONT3 may include a vertical start signal and an emission clock signal.

The gate driver 300 may generate gate signals for driving the gate lines GL in response to the first control signal CONT1 received from the driving controller 200. The gate driver 300 may output the gate signals to the gate lines GL. For example, the gate driver 300 may sequentially output the gate signals to the gate lines GL.

The data driver 400 may receive the second control signal CONT2 and the data signal DATA from the driving controller 200. The data driver 400 may generate data voltages by converting the data signal DATA into analog voltages. The data driver 400 may output the data voltages to the data lines DL.

The emission driver 500 may generate emission signals for driving the emission lines EL in response to the third control signal CONT3 received from the driving controller 200. The emission driver 500 may output the emission signals to the emission lines EL. For example, the emission driver 500 may sequentially output the emission signals to the emission lines EL.

Figure 8:
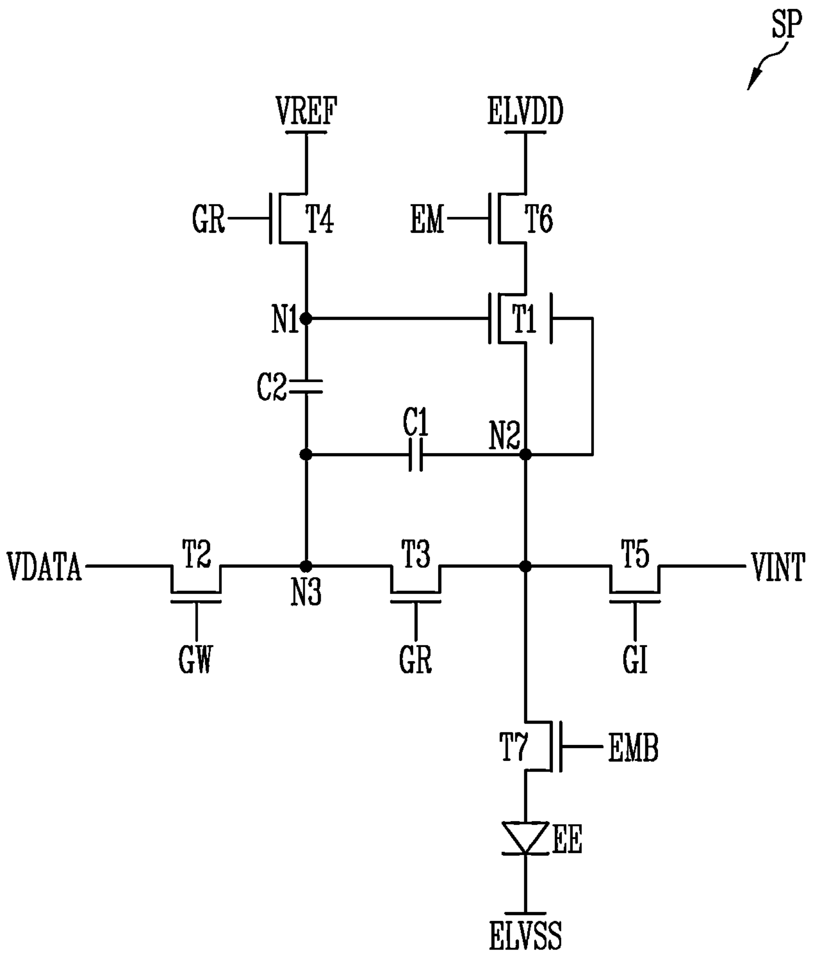
FIG. 8 is a circuit diagram illustrating a sub-pixel of the display device in accordance with embodiments of the present disclosure.

In an embodiment, the emission driver 500 may generate emission bias signals EMB in FIG. 8 for driving the emission lines EL, and output the emission bias signals EMB in FIG. 8 to the emission lines EL.

Figure 6:
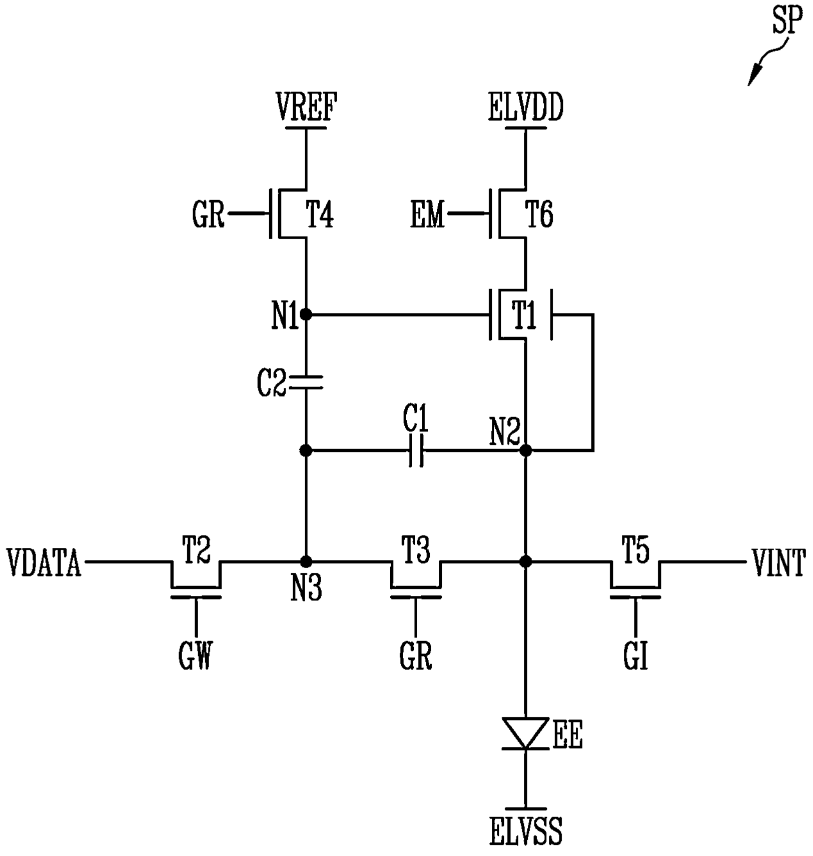
FIG. 6 is a circuit diagram illustrating an example of a sub-pixel of the display device of FIG. 5.
Figure 7:
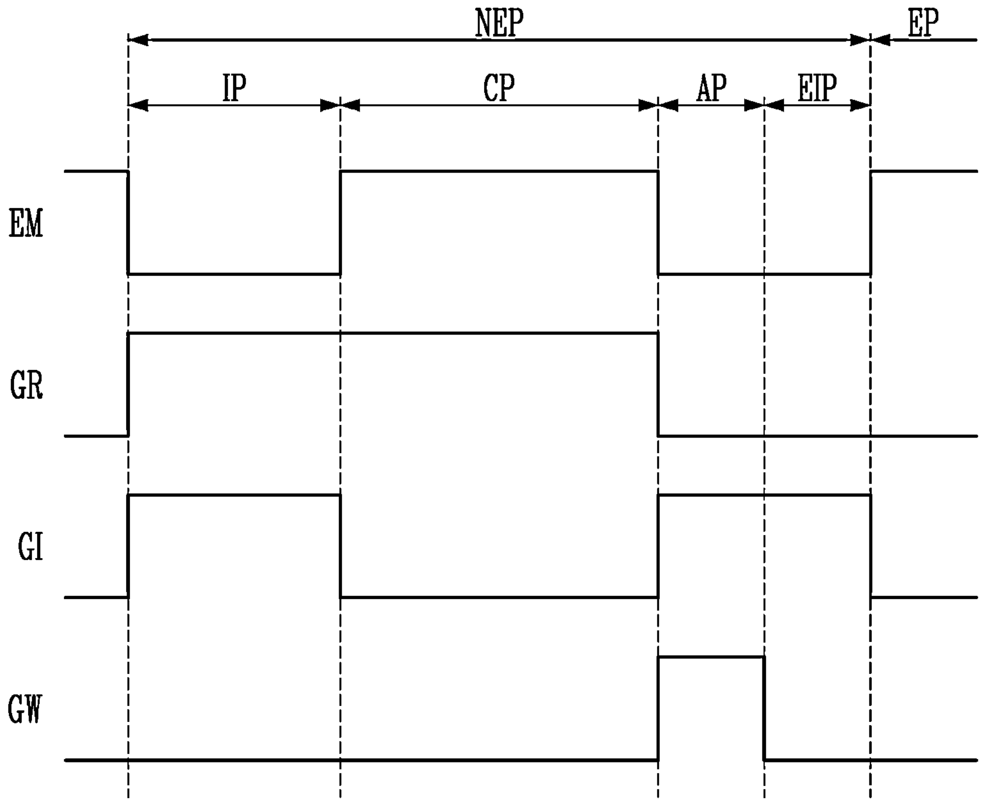
FIG. 7 is a timing diagram illustrating an example of driving the sub-pixel in the display device of FIG. 6.

FIG. 6 is a circuit diagram illustrating an example of a sub-pixel of the display device of FIG. 5. FIG. 7 is a timing diagram illustrating an example of driving the sub-pixel in the display device of FIG. 6.

The configuration of the sub-pixel SP in accordance with the present embodiments is substantially the same as that of the sub-pixel SP of FIG. 2, other than a sixth transistor T6; therefore, identical or similar components are denoted by the same reference numerals and symbols, and redundant explanation thereof will be omitted.

Referring to FIG. 6, the sub-pixel SP may further include the sixth transistor T6 configured to provide a first power voltage ELVDD to the first transistor T1 in response to an emission signal EM.

For example, the first transistor T1 may include a second electrode connected to a second electrode of the sixth transistor T6. The sixth transistor T6 may include a control electrode configured to receive an emission signal EM, a first electrode configured to receive the first power voltage ELVDD, and the second electrode connected to the second electrode of the first transistor T1.

The sixth transistor T6 may be implemented using an NMOS transistor. However, the present disclosure is not limited to the aforementioned example. The sixth transistor T6 may be implemented using a PMOS transistor.

Referring to FIGS. 6 and 7, one frame may include a non-emission period NEP and an emission period EP. For example, the light emitting element EE may emit light during the emission period EP. The non-emission period NEP may include an initialization period IP, a compensation period CP, an addressing period AP, and an emission initialization period EIP.

For example, in the initialization period IP, each of the reference gate signal GR and the initialization gate signal GI may have an enable level, and the third to fifth transistors T3 to T5 may be turned on. Hence, the voltage of the first node N1 may be VREF, and the voltage of each of the second and third nodes N2 and N3 may be VINT. In other words, the first and second capacitors C1 and C2 may be initialized.

For example, in one frame, during the compensation period CP following the initialization period IP, each of the reference gate signal GR and the emission signal EM may have an enable level, and the third, fourth, and sixth transistors T3, T4, and T6 may be turned on. Hence, the voltage of the first node N1 may be VREF, and the voltage of each of the second and third nodes N2 and N3 may be VREF−VTH. In other words, because a voltage corresponding to VREF−VTH is stored in the first and second capacitors C1 and C2, the threshold voltage of the first transistor T1 may be compensated for during the emission period EP.

For example, in one frame, during the addressing period AP following the initialization period IP, each of the initialization gate signal GI and the write gate signal GW may have an enable level, and the second and fifth transistors T2 and T5 may be turned on. Hence, the voltage of the first node N1 may be VDATA+VTH, the voltage of the second node N2 may be VINT, and the voltage of the third node N3 may be VDATA. In other words, the data voltage VDATA may be written to the first and second capacitors C1 and C2.

For example, in one frame, during the emission initialization period EIP following the addressing period AP, the initialization gate signal GI may have an enable level, and the fifth transistor T5 may be turned on. In other words, the voltage of the second node N2 may be initialized.

For example, during the emission period EP, the emission signal EM may have an enable level, and the sixth transistor T6 may be turned on. The first transistor T1 may generate driving current corresponding to a gate-source voltage (i.e., a voltage between the first node N1 and the second node N2). The gate-source voltage of the first transistor T1 may be VDATA−VINT+VTH.

Figure 9:
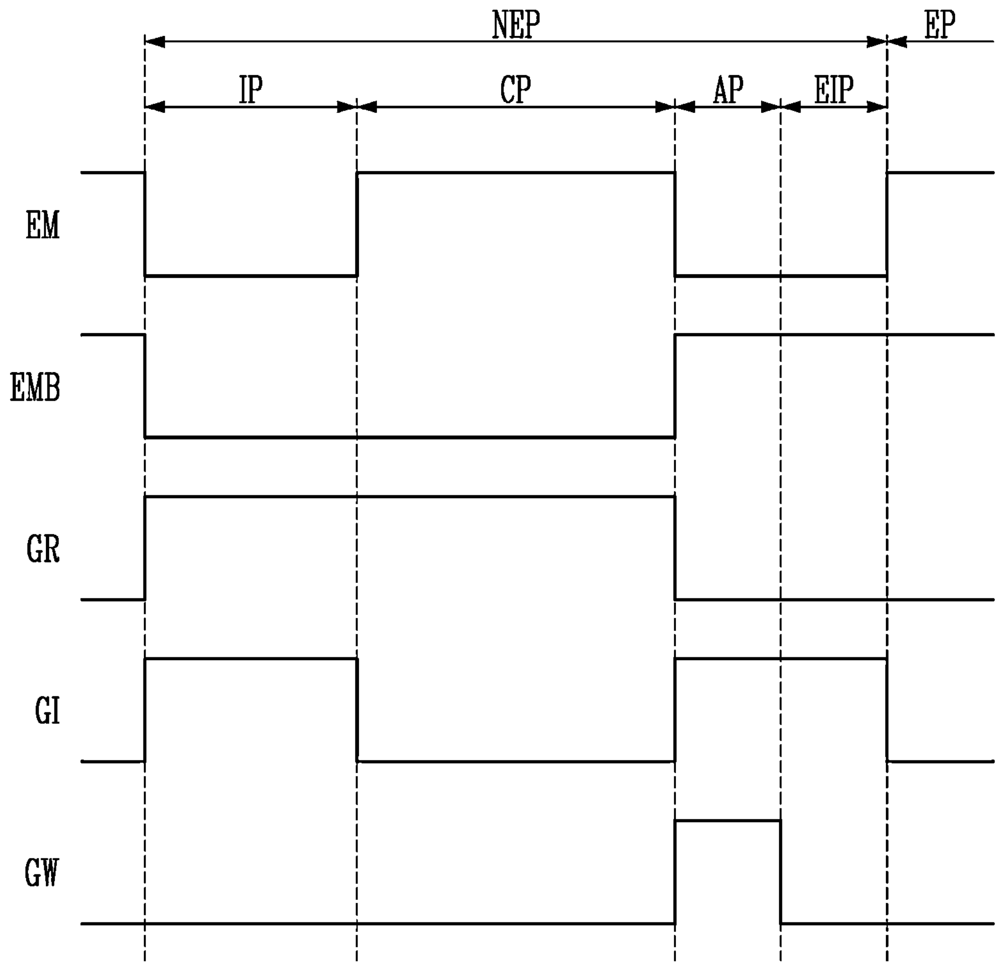
FIG. 9 is a timing diagram illustrating an example of driving the sub-pixel in the display device of FIG. 8.

FIG. 8 is a circuit diagram illustrating a sub-pixel SP of the display device in accordance with embodiments of the present disclosure. FIG. 9 is a timing diagram illustrating an example of driving the sub-pixel SP in the display device of FIG. 8.

The configuration of the sub-pixel SP in accordance with the present embodiments is substantially the same as that of the sub-pixel SP of FIG. 6, other than fifth and seventh transistors T5 and T7; therefore, identical or similar components are denoted by the same reference numerals and symbols, and redundant explanation thereof will be omitted.

Referring to FIG. 8, the sub-pixel SP may further include the fifth transistor T5 configured to provide an initialization voltage VINT to the first electrode of the first transistor T1 in response to an initialization gate signal GI, and the seventh transistor T7 configured to connect the first electrode of the first transistor T1 to the first electrode of the light emitting element EE in response to an emission bias signal EMB.

For example, the fifth transistor T5 may include a control electrode configured to receive the initialization gate signal GI, a first electrode configured to receive the initialization voltage VINT, and a second electrode connected to the second node N2. The seventh transistor T7 may include a control electrode configured to receive the emission bias signal EMB, a first electrode connected to the second node N2, and a second electrode connected to the first electrode of the light emitting element EE.

Each of the fifth and seventh transistors T5 and T7 may be implemented using an NMOS transistor. However, the present disclosure is not limited to the aforementioned example. For example, each of the fifth and seventh transistors T5 and T7 may be implemented using a PMOS transistor.

Referring to FIGS. 8 to 9, one frame may include a non-emission period NEP and an emission period EP. For example, the light emitting element EE may emit light during the emission period EP. The non-emission period NEP may include an initialization period IP, a compensation period CP, an addressing period AP, and an emission initialization period EIP.

For example, in the initialization period IP, each of the reference gate signal GR and the initialization gate signal GI may have an enable level, and the third to fifth transistors T3 to T5 may be turned on. Hence, the voltage of the first node N1 may be VREF, and the voltage of each of the second and third nodes N2 and N3 may be VINT. In other words, the first and second capacitors C1 and C2 may be initialized.

For example, in one frame, during the compensation period CP following the initialization period IP, each of the reference gate signal GR and the emission signal EM may have an enable level, and the third, fourth, and sixth transistors T3, T4, and T6 may be turned on. Hence, the voltage of the first node N1 may be VREF, and the voltage of each of the second and third nodes N2 and N3 may be VREF−VTH. In other words, because a voltage corresponding to VREF−VTH is stored in the first and second capacitors C1 and C2, the threshold voltage of the first transistor T1 may be compensated for during the emission period EP.

For example, in one frame, during the addressing period AP following the initialization period IP, each of the initialization gate signal GI, the write gate signal GW, and the emission bias signal EMB may have an enable level, and the second, fifth, and seventh transistors T2, T5, and T7 may be turned on. Hence, the voltage of the first node N1 may be VDATA+VTH, the voltage of the second node N2 may be VINT, and the voltage of the third node N3 may be VDATA. In other words, the data voltage VDATA may be written to the first and second capacitors C1 and C2.

For example, in one frame, during the emission initialization period EIP following the addressing period AP, each of the initialization gate signal GI and the emission bias signal EMB may have an enable level, and the fifth and seventh transistors T5 and T7 may be turned on. In other words, the voltages of the second node N2 and the first electrode of the light emitting element EE may be initialized.

For example, during the emission period EP, each of the emission signal EM and the emission bias signal EMB may have an enable level, and the sixth and seventh transistors T6 and T7 may be turned on. The first transistor T1 may generate driving current corresponding to a gate-source voltage (i.e., a voltage between the first node N1 and the second node N2). The gate-source voltage of the first transistor T1 may be VDATA−VINT+VTH.

Figure 10:
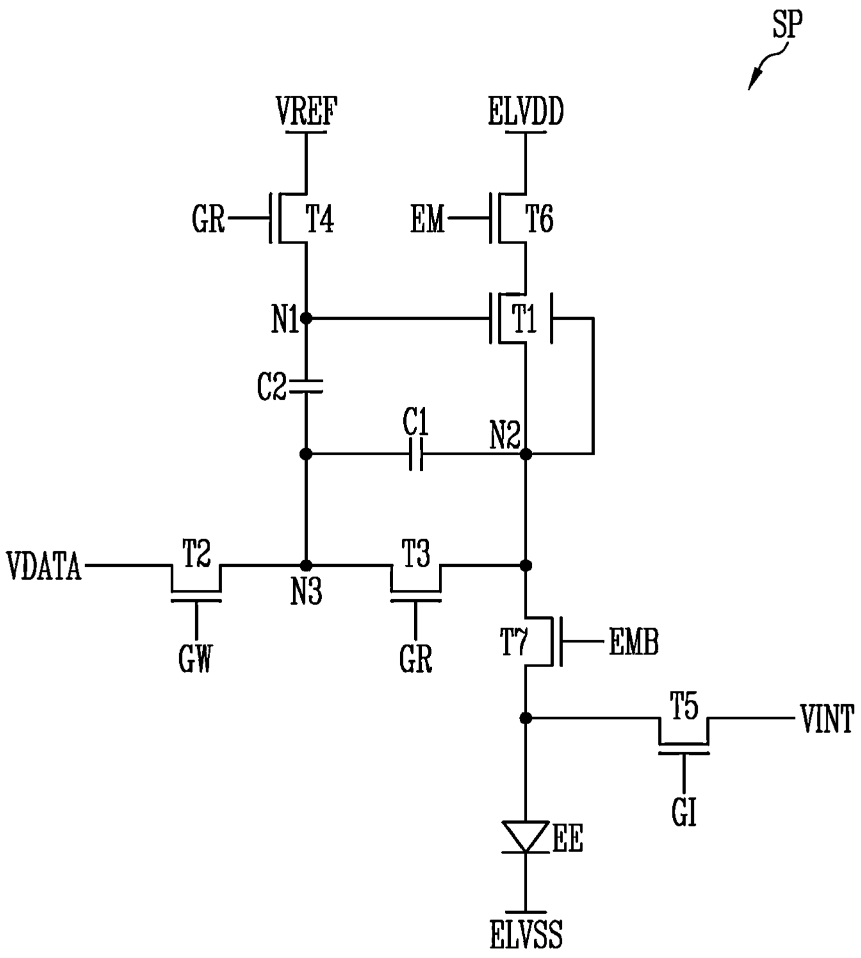
FIG. 10 is a circuit diagram illustrating a sub-pixel of the display device in accordance with embodiments of the present disclosure.

FIG. 10 is a circuit diagram illustrating a sub-pixel SP of the display device in accordance with embodiments of the present disclosure.

The configuration of the sub-pixel SP in accordance with the present embodiments is substantially the same as that of the sub-pixel SP of FIG. 6, other than a seventh transistor T7; therefore, identical or similar components are denoted by the same reference numerals and symbols, and redundant explanation thereof will be omitted.

Referring to FIG. 10, the sub-pixel SP may further include the seventh transistor T7 configured to connect the first electrode of the first transistor T1 to the first electrode of the light emitting element EE in response to an emission bias signal EMB. The display device in FIG. 10 may drive the sub-pixel SP in a manner substantially identical to that of FIG. 9; therefore, redundant explanations will be omitted.

Figure 11:
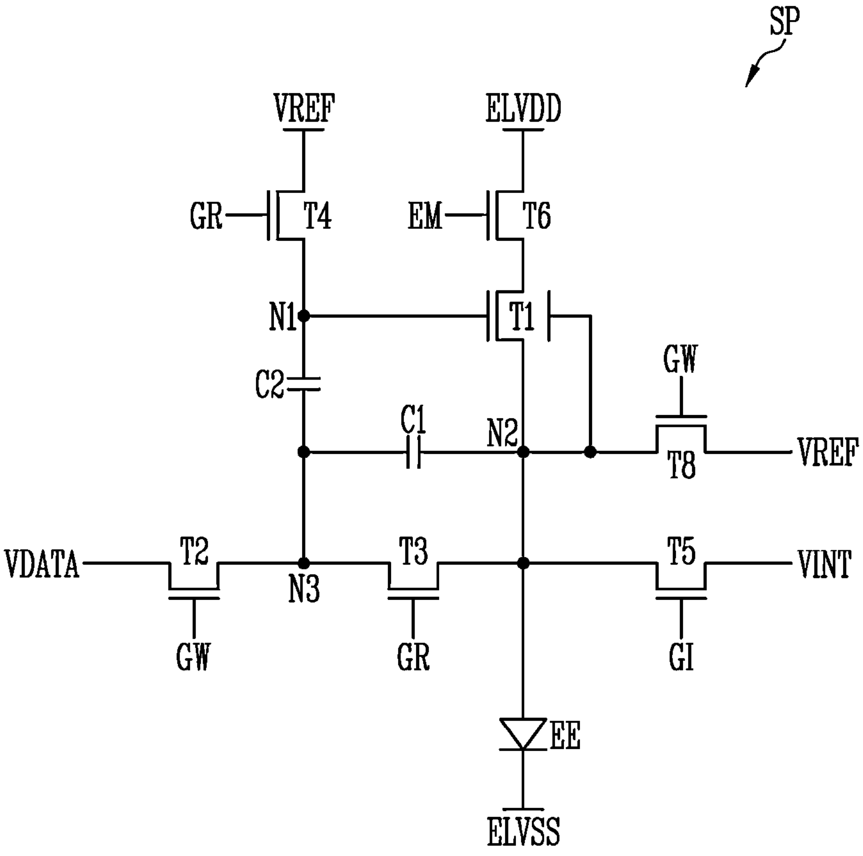
FIG. 11 is a circuit diagram illustrating a sub-pixel of the display device in accordance with embodiments of the present disclosure.
Figure 12:
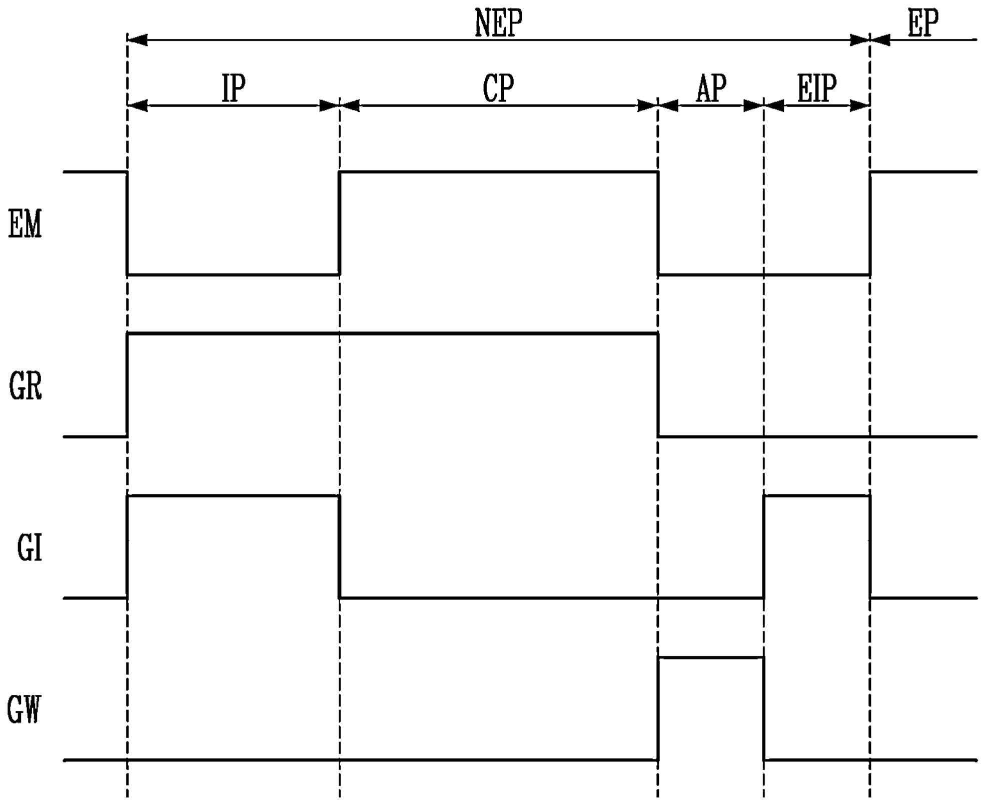
FIG. 12 is a timing diagram illustrating an example of driving the sub-pixel in the display device of FIG. 11.

FIG. 11 is a circuit diagram illustrating a sub-pixel SP of the display device in accordance with embodiments of the present disclosure. FIG. 12 is a timing diagram illustrating an example of driving the sub-pixel SP in the display device of FIG. 11.

The configuration of the sub-pixel SP in accordance with the present embodiments is substantially the same as that of the sub-pixel SP of FIG. 6, other than an eighth transistor T8; therefore, identical or similar components are denoted by the same reference numerals and symbols, and redundant explanation thereof will be omitted.

Referring to FIG. 11, the sub-pixel SP may further include the eighth transistor T8 configured to provide a reference voltage VREF to the first electrode of the first transistor T1 in response to a write gate signal GW.

For example, the eighth transistor T8 may include a control electrode configured to receive the write gate signal GW, a first electrode configured to receive the reference voltage VREF, and a second electrode connected to the second node N2.

The eighth transistor T8 may be implemented using an NMOS transistor. However, the present disclosure is not limited to the aforementioned example. The eighth transistor T8 may be implemented using a PMOS transistor.

Referring to FIGS. 11 to 12, one frame may include a non-emission period NEP and an emission period EP. For example, the light emitting element EE may emit light during the emission period EP. The non-emission period NEP may include an initialization period IP, a compensation period CP, an addressing period AP, and an emission initialization period EIP.

For example, in the initialization period IP, each of the reference gate signal GR and the initialization gate signal GI may have an enable level, and the third to fifth transistors T3 to T5 may be turned on. Hence, the voltage of the first node N1 may be VREF, and the voltage of each of the second and third nodes N2 and N3 may be VINT. In other words, the first and second capacitors C1 and C2 may be initialized.

For example, in one frame, during the compensation period CP following the initialization period IP, each of the reference gate signal GR and the emission signal EM may have an enable level, and the third, fourth, and sixth transistors T3, T4, and T6 may be turned on. Hence, the voltage of the first node N1 may be VREF, and the voltage of each of the second and third nodes N2 and N3 may be VREF−VTH. In other words, because a voltage corresponding to VREF−VTH is stored in the first and second capacitors C1 and C2, the threshold voltage of the first transistor T1 may be compensated for during the emission period EP.

For example, in one frame, during the addressing period AP following the initialization period IP, the write gate signal GW may have an enable level, and the second and eighth transistors T2 and T8 may be turned on. Hence, the voltage of the first node N1 may be VDATA+VTH, the voltage of the second node N2 may be VREF, and the voltage of the third node N3 may be VDATA. In other words, the data voltage VDATA may be written to the first and second capacitors C1 and C2.

For example, in one frame, during the emission initialization period EIP following the addressing period AP, the initialization gate signal GI may have an enable level, and the fifth transistor T5 may be turned on. In other words, the voltage of the second node N2 may be initialized.

For example, during the emission period EP, the emission signal EM may have an enable level, and the sixth transistor T6 may be turned on. The first transistor T1 may generate driving current corresponding to a gate-source voltage (i.e., a voltage between the first node N1 and the second node N2). The gate-source voltage of the first transistor T1 may be VDATA−VREF+VTH. Setting the voltage value for the reference voltage VREF may be easier than for the initialization voltage VINT. Therefore, the range of the data voltage VDATA may be adjusted by adjusting the reference voltage VREF. Consequently, the power consumption of the display device may be reduced.

Figure 13:
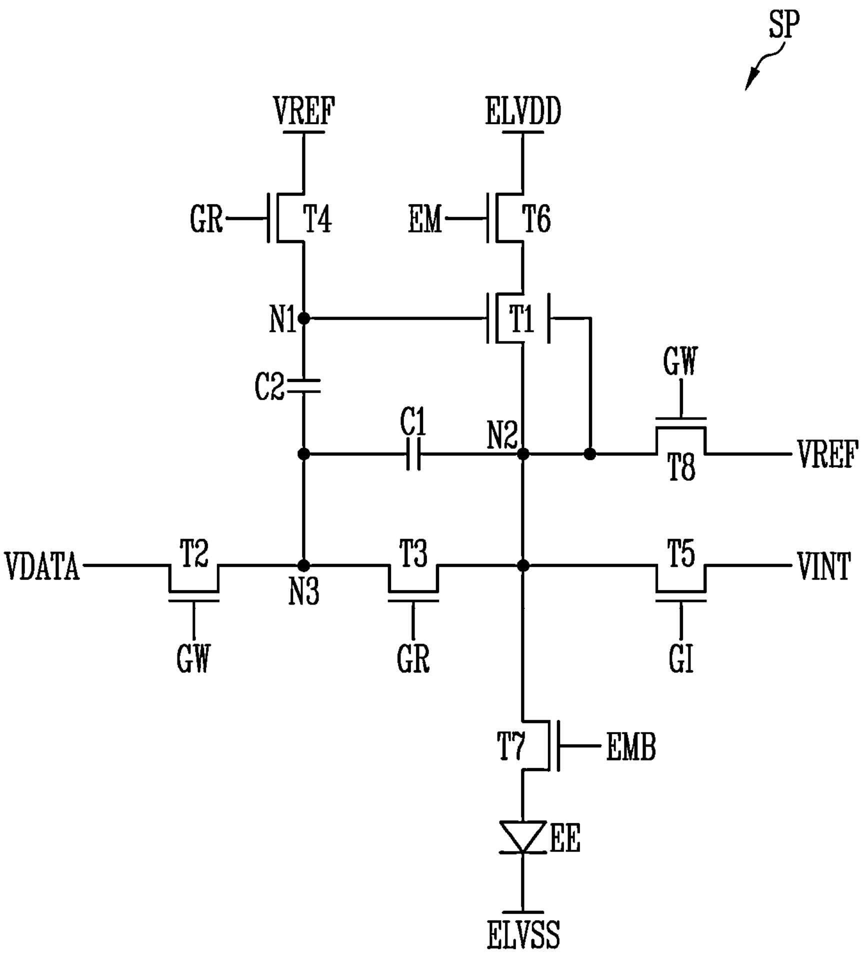
FIG. 13 is a circuit diagram illustrating a sub-pixel of the display device in accordance with embodiments of the present disclosure.
Figure 14:
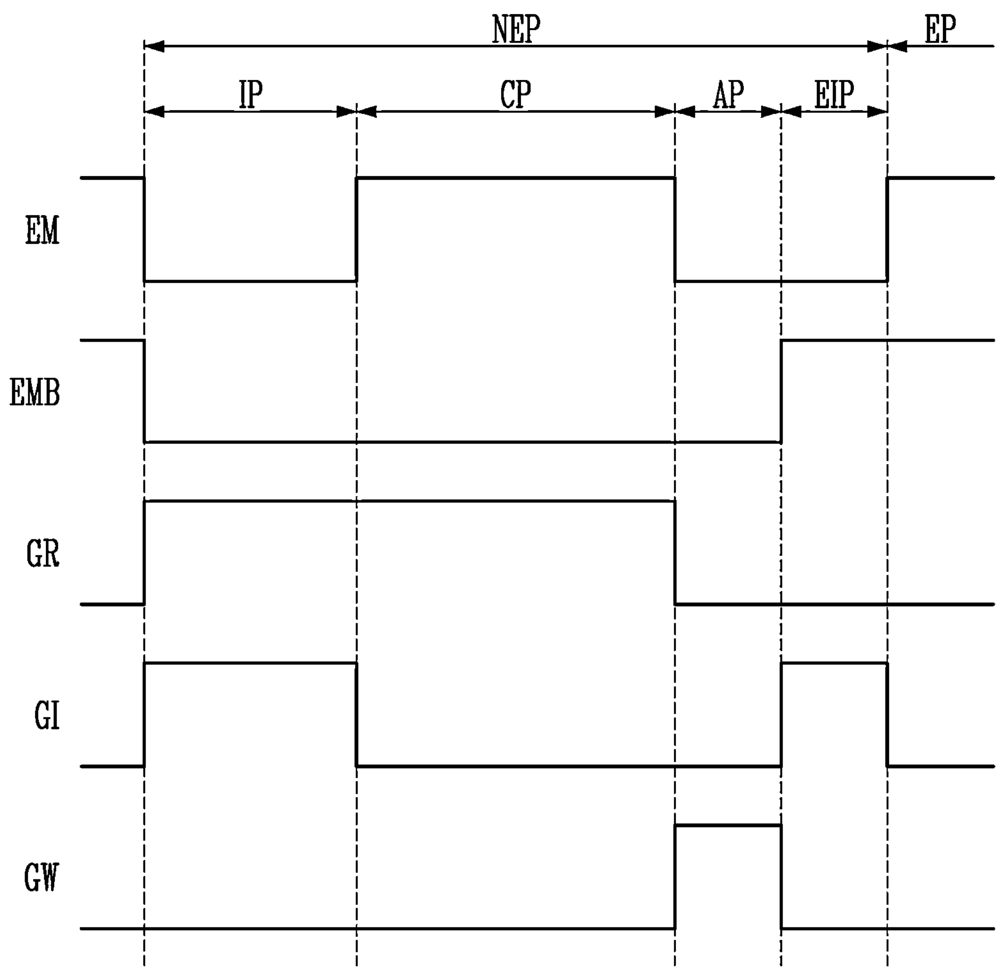
FIG. 14 is a timing diagram illustrating an example of driving the sub-pixel in the display device of FIG. 13.

FIG. 13 is a circuit diagram illustrating a sub-pixel SP of the display device in accordance with embodiments of the present disclosure. FIG. 14 is a timing diagram illustrating an example of driving the sub-pixel SP in the display device of FIG. 13.

The configuration of the sub-pixel SP in accordance with the present embodiments is substantially the same as that of the sub-pixel SP of FIG. 11, other than fifth and seventh transistors T5 and T7; therefore, identical or similar components are denoted by the same reference numerals and symbols, and redundant explanation thereof will be omitted.

Referring to FIG. 13, the sub-pixel SP may further include the fifth transistor T5 configured to provide an initialization voltage VINT to the first electrode of the first transistor T1 in response to an initialization gate signal GI, and the seventh transistor T7 configured to connect the first electrode of the first transistor T1 to the first electrode of the light emitting element EE in response to an emission bias signal EMB.

For example, the fifth transistor T5 may include a control electrode configured to receive the initialization gate signal GI, a first electrode configured to receive the initialization voltage VINT, and a second electrode connected to the second node N2. The seventh transistor T7 may include a control electrode configured to receive the emission bias signal EMB, a first electrode connected to the second node N2, and a second electrode connected to the first electrode of the light emitting element EE.

Each of the fifth and seventh transistors T5 and T7 may be implemented using an NMOS transistor. However, the present disclosure is not limited to the aforementioned example. For example, each of the fifth and seventh transistors T5 and T7 may be implemented using a PMOS transistor.

Referring to FIGS. 13 to 14, one frame may include a nonemission period NEP and an emission period EP. For example, the light emitting element EE may emit light during the emission period EP. The non-emission period NEP may include an initialization period IP, a compensation period CP, an addressing period AP, and an emission initialization period EIP.

For example, in the initialization period IP, each of the reference gate signal GR and the initialization gate signal GI may have an enable level, and the third to fifth transistors T3 to T5 may be turned on. Hence, the voltage of the first node N1 may be VREF, and the voltage of each of the second and third nodes N2 and N3 may be VINT. In other words, the first and second capacitors C1 and C2 may be initialized.

For example, in one frame, during the compensation period CP following the initialization period IP, each of the reference gate signal GR and the emission signal EM may have an enable level, and the third, fourth, and sixth transistors T3, T4, and T6 may be turned on. Hence, the voltage of the first node N1 may be VREF, and the voltage of each of the second and third nodes N2 and N3 may be VREF−VTH. In other words, because a voltage corresponding to VREF−VTH is stored in the first and second capacitors C1 and C2, the threshold voltage of the first transistor T1 may be compensated for during the emission period EP.

For example, in one frame, during the addressing period AP following the initialization period IP, the write gate signal GW may have an enable level, and the second and eighth transistors T2 and T8 may be turned on. Hence, the voltage of the first node N1 may be VDATA+VTH, the voltage of the second node N2 may be VREF, and the voltage of the third node N3 may be VDATA. In other words, the data voltage VDATA may be written to the first and second capacitors C1 and C2.

For example, in one frame, during the emission initialization period EIP following the addressing period AP, each of the initialization gate signal GI and the emission bias signal EMB may have an enable level, and the fifth and seventh transistors T5 and T7 may be turned on. In other words, the voltages of the second node N2 and the first electrode of the light emitting element EE may be initialized.

For example, during the emission period EP, each of the emission signal EM and the emission bias signal EMB may have an enable level, and the sixth and seventh transistors T6 and T7 may be turned on. The first transistor T1 may generate driving current corresponding to a gate-source voltage (i.e., a voltage between the first node N1 and the second node N2). The gate-source voltage of the first transistor T1 may be VDATA−VREF+VTH.

Figure 15:
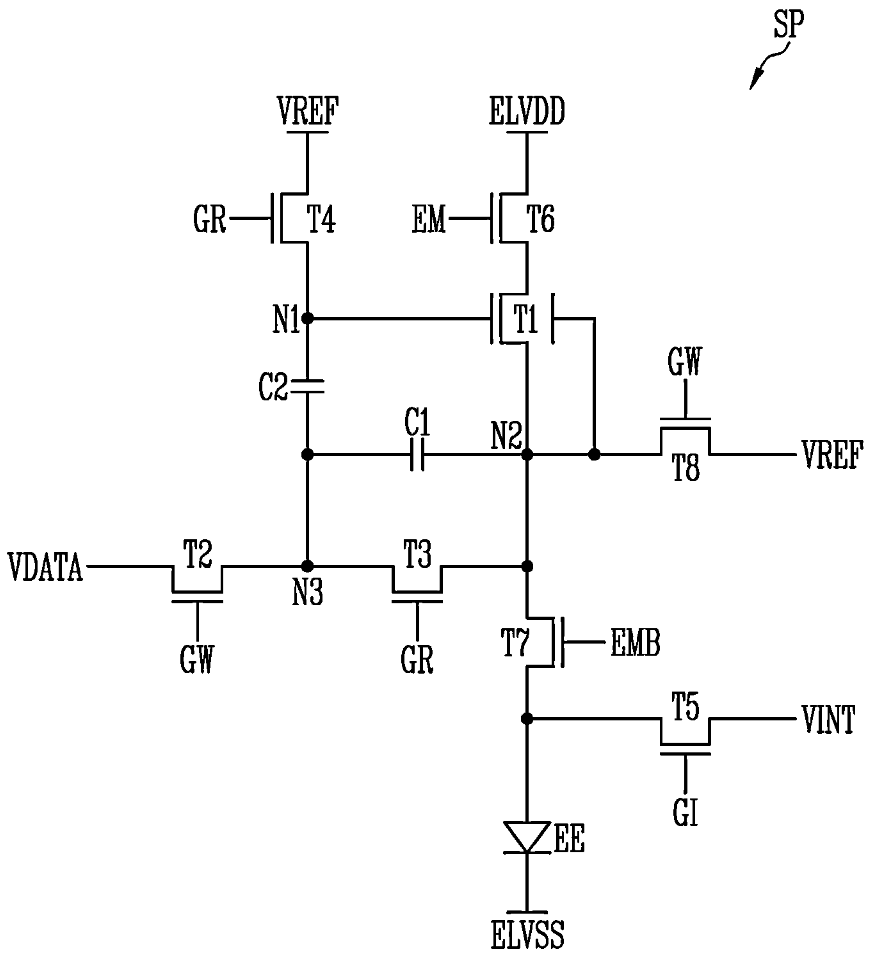
FIG. 15 is a circuit diagram illustrating a sub-pixel of the display device in accordance with embodiments of the present disclosure.

FIG. 15 is a circuit diagram illustrating a sub-pixel SP of the display device in accordance with embodiments of the present disclosure.

The configuration of the sub-pixel SP in accordance with the present embodiments is substantially the same as that of the sub-pixel SP of FIG. 11, other than a seventh transistor T7; therefore, identical or similar components are denoted by the same reference numerals and symbols, and redundant explanation thereof will be omitted.

Referring to FIG. 15, the sub-pixel SP may further include the seventh transistor T7 configured to connect the first electrode of the first transistor T1 to the first electrode of the light emitting element EE in response to an emission bias signal EMB. The display device in FIG. 15 may drive the sub-pixel SP in a manner substantially identical to that of FIG. 14; therefore, redundant explanations will be omitted.

Figure 16:
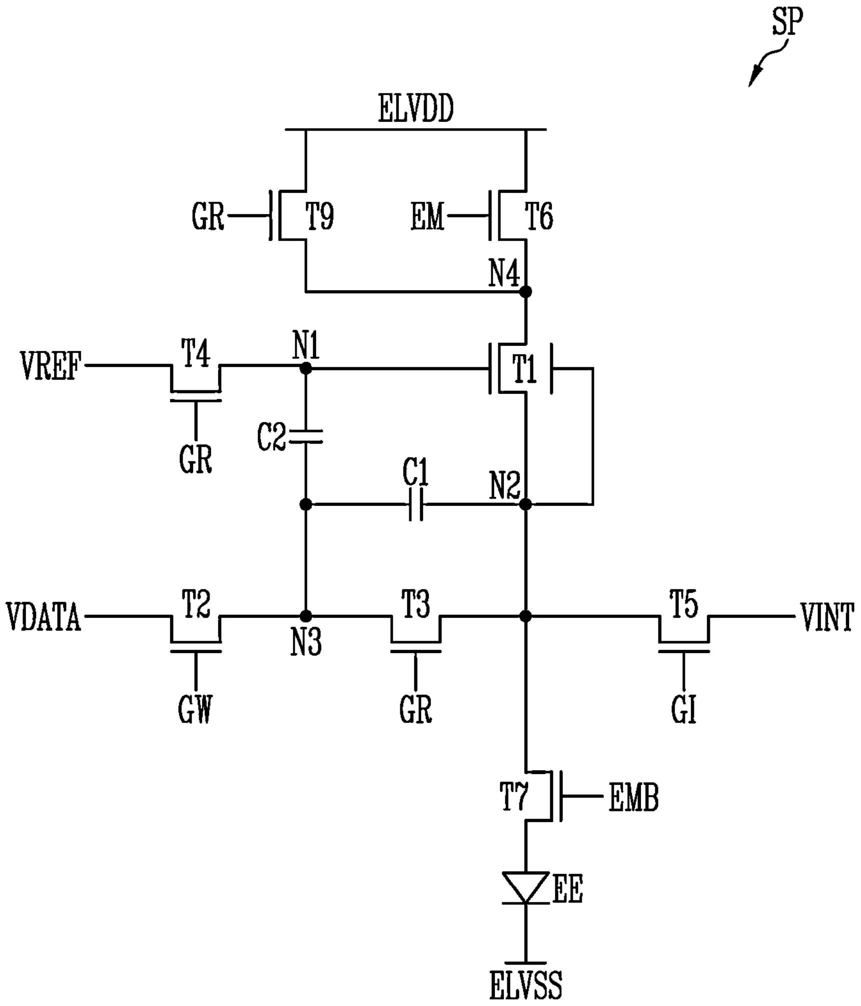
FIG. 16 is a circuit diagram illustrating a sub-pixel of the display device in accordance with embodiments of the present disclosure.
Figure 17:
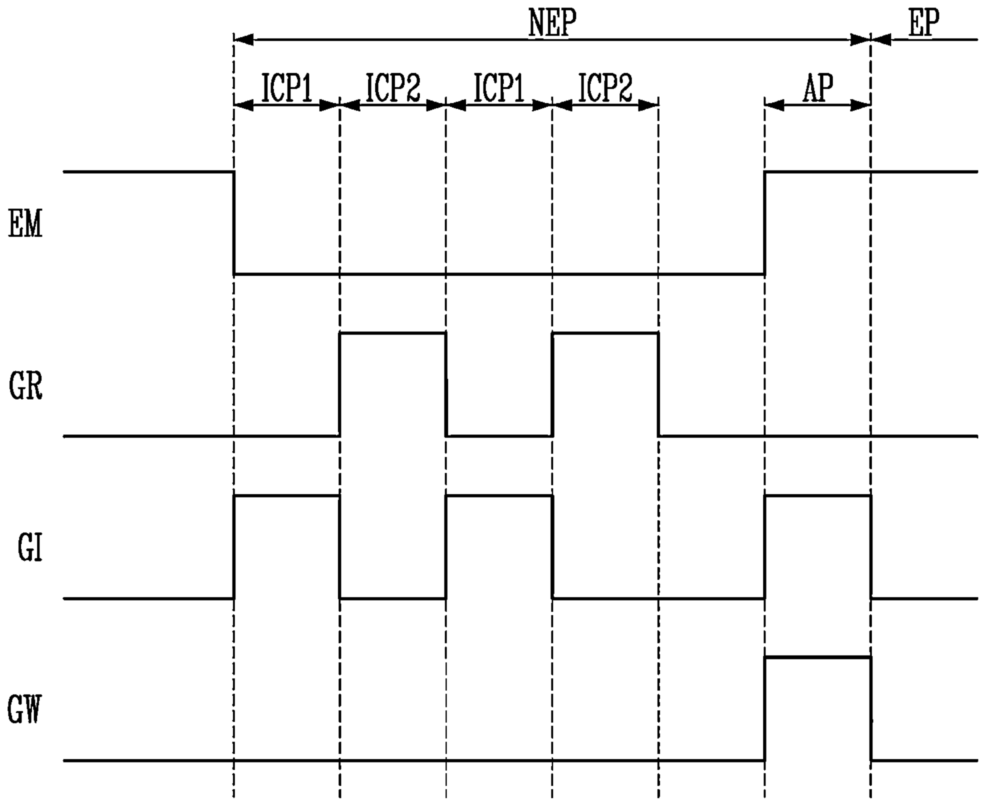
FIG. 17 is a timing diagram illustrating an example of driving the sub-pixel during a non-emission period in the display device of FIG. 16.
Figure 18:
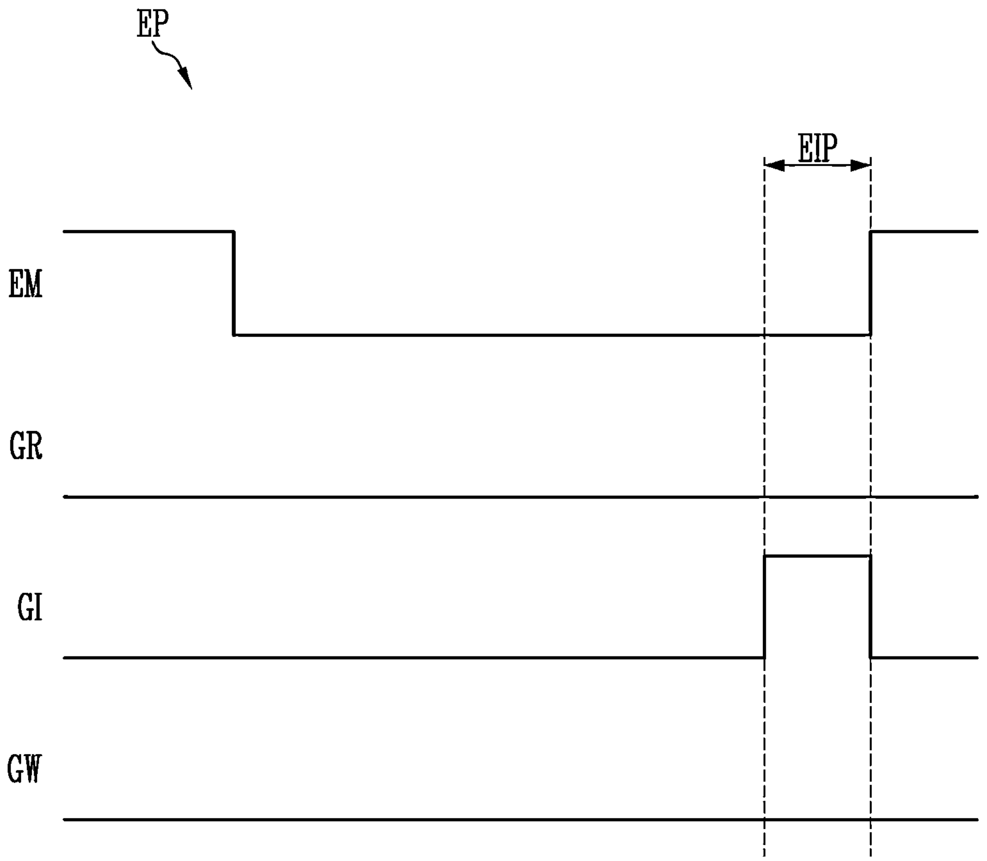
FIG. 18 is a timing diagram illustrating an example of driving the sub-pixel during an emission period in the display device of FIG. 16.

FIG. 16 is a circuit diagram illustrating a sub-pixel SP of the display device in accordance with embodiments of the present disclosure. FIG. 17 is a timing diagram illustrating an example of driving the sub-pixel SP during a non-emission period in the display device of FIG. 16. FIG. 18 is a timing diagram illustrating an example of driving the sub-pixel during an emission period in the display device of FIG. 16.

The configuration of the sub-pixel SP in accordance with the present embodiments is substantially the same as that of the sub-pixel SP of FIG. 6, other than a ninth transistor T9; therefore, identical or similar components are denoted by the same reference numerals and symbols, and redundant explanation thereof will be omitted.

Referring to FIG. 16, the sub-pixel SP may further include the ninth transistor T9 configured to provide a first power voltage ELVDD to the first transistor T1 in response to a reference gate signal GR.

For example, the second electrode of the first transistor T1 may be connected to a fourth node N4. The ninth transistor T9 may include a control electrode configured to receive the reference gate signal GR, a first electrode configured to receive the first power voltage ELVDD, and a second electrode connected to the fourth node N4. The second electrode of the sixth transistor T6 may be connected to the fourth node N4.

For example, the fifth transistor T5 may include a control electrode configured to receive the initialization gate signal GI, a first electrode configured to receive the initialization voltage VINT, and a second electrode connected to the second node N2. The seventh transistor T7 may include a control electrode configured to receive the emission bias signal EMB, a first electrode connected to the second node N2, and a second electrode connected to the first electrode of the light emitting element EE.

The ninth transistor T9 may be implemented using an NMOS transistor. However, the present disclosure is not limited to the aforementioned example. The ninth transistor T9 may be implemented using a PMOS transistor.

Referring to FIGS. 16 to 18, one frame may include a non-emission period NEP and an emission period EP. For example, the light emitting element EE may emit light during the emission period EP. The non-emission period NEP may include a first compensation initialization period ICP1, a second compensation initialization period ICP2, and an addressing period AP. The emission period EP may include an emission initialization period EIP.

In an embodiment, the first compensation initialization period ICP1 and the second compensation initialization period ICP2 may be alternately arranged. The second compensation initialization period ICP2 may be positioned immediately before the addressing period AP. In the present embodiment, there has been illustrated the case where the first compensation initialization period ICP1 and the second compensation initialization period ICP2 are repeated twice, but the present disclosure is not limited thereto.

For example, during the first compensation initialization period ICP1, the initialization gate signal GI may have an enable level, and the fifth transistor T5 may be turned on. Hence, the voltage of the second node N2 may be VINT.

For example, during the second compensation initialization period ICP2, the reference gate signal GR may have an enable level, and the third, fourth, and ninth transistors T3, T4, and T9 may be turned on. Hence, the voltage of the first node N1 may be VREF, and the voltage of each of the second and third nodes N2 and N3 may be VREF−VTH. In other words, because a voltage corresponding to VREF−VTH is stored in the first and second capacitors C1 and C2, the threshold voltage of the first transistor T1 may be compensated for during the emission period EP.

For example, in one frame, during the addressing period AP following the first compensation initialization period ICP1 and the second compensation initialization period ICP2, each of the initialization gate signal GI and the write gate signal GW may have an enable level, and the second and fifth transistors T2 and T5 may be turned on. Hence, the voltage of the first node N1 may be VDATA+VTH, the voltage of the second node N2 may be VINT, and the voltage of the third node N3 may be VDATA. In other words, the data voltage VDATA may be written to the first and second capacitors C1 and C2.

For example, in one frame, during the emission initialization period EIP following the addressing period AP, the initialization gate signal GI may have an enable level, and the fifth transistor T5 may be turned on. In other words, the voltage of the second node N2 may be initialized.

For example, during the emission period EP, the emission signal EM may periodically have an enable level and a disable level. While the emission signal EM has an enable level, the sixth transistor T6 may be turned on. The first transistor T1 may generate driving current corresponding to a gate-source voltage (i.e., a voltage between the first node N1 and the second node N2). The gate-source voltage of the first transistor T1 may be VDATA−VINT+VTH.

Figure 19:
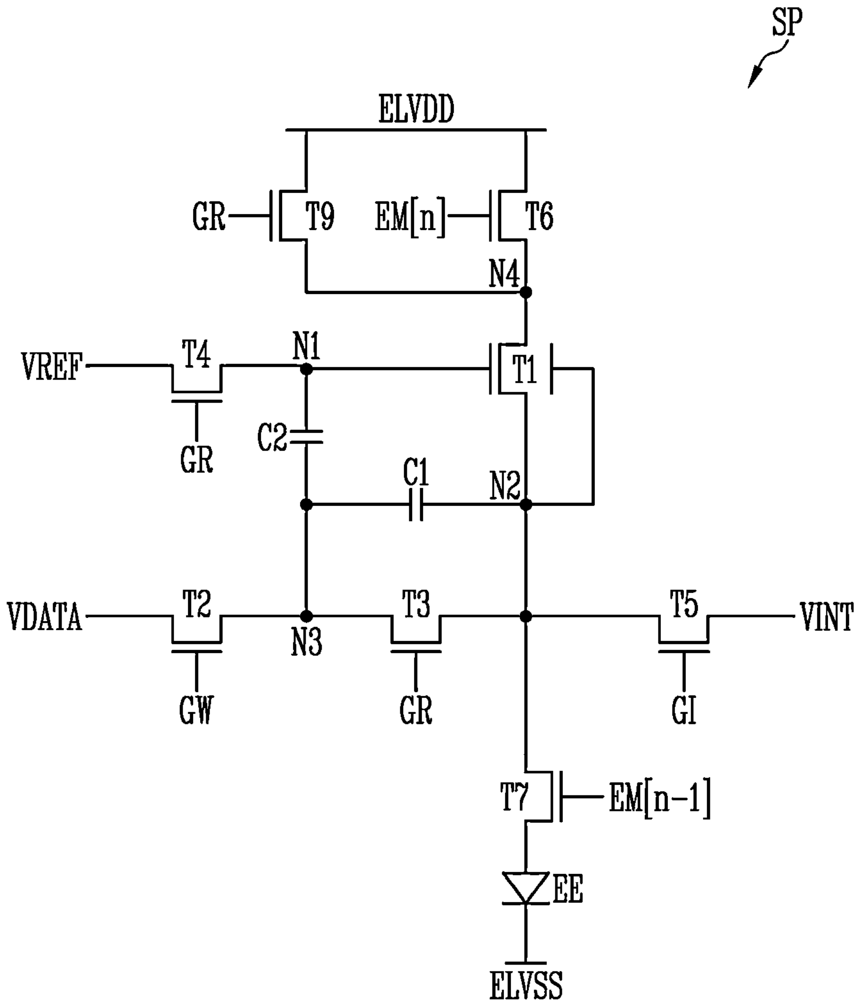
FIG. 19 is a circuit diagram illustrating a sub-pixel of the display device in accordance with embodiments of the present disclosure.
Figure 20:
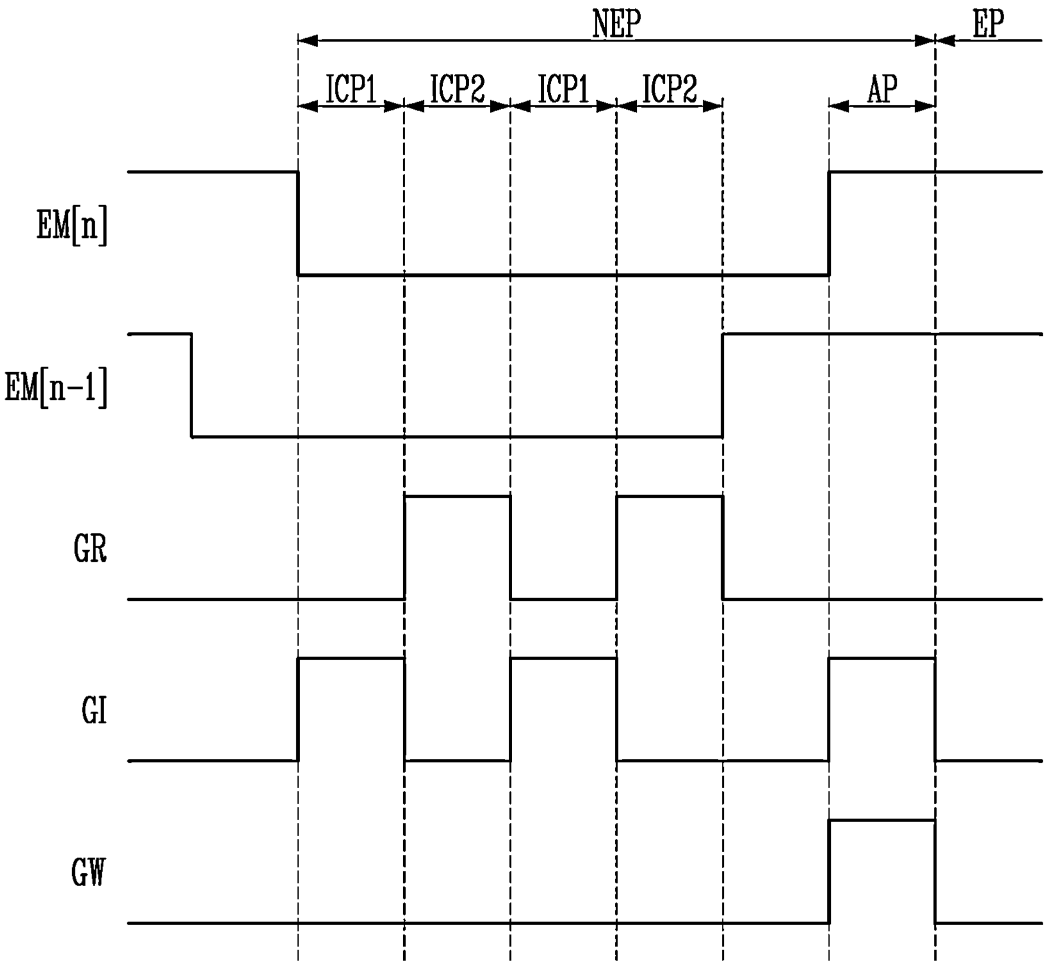
FIG. 20 is a timing diagram illustrating an example of driving the sub-pixel during a non-emission period in the display device of FIG. 19.
Figure 21:
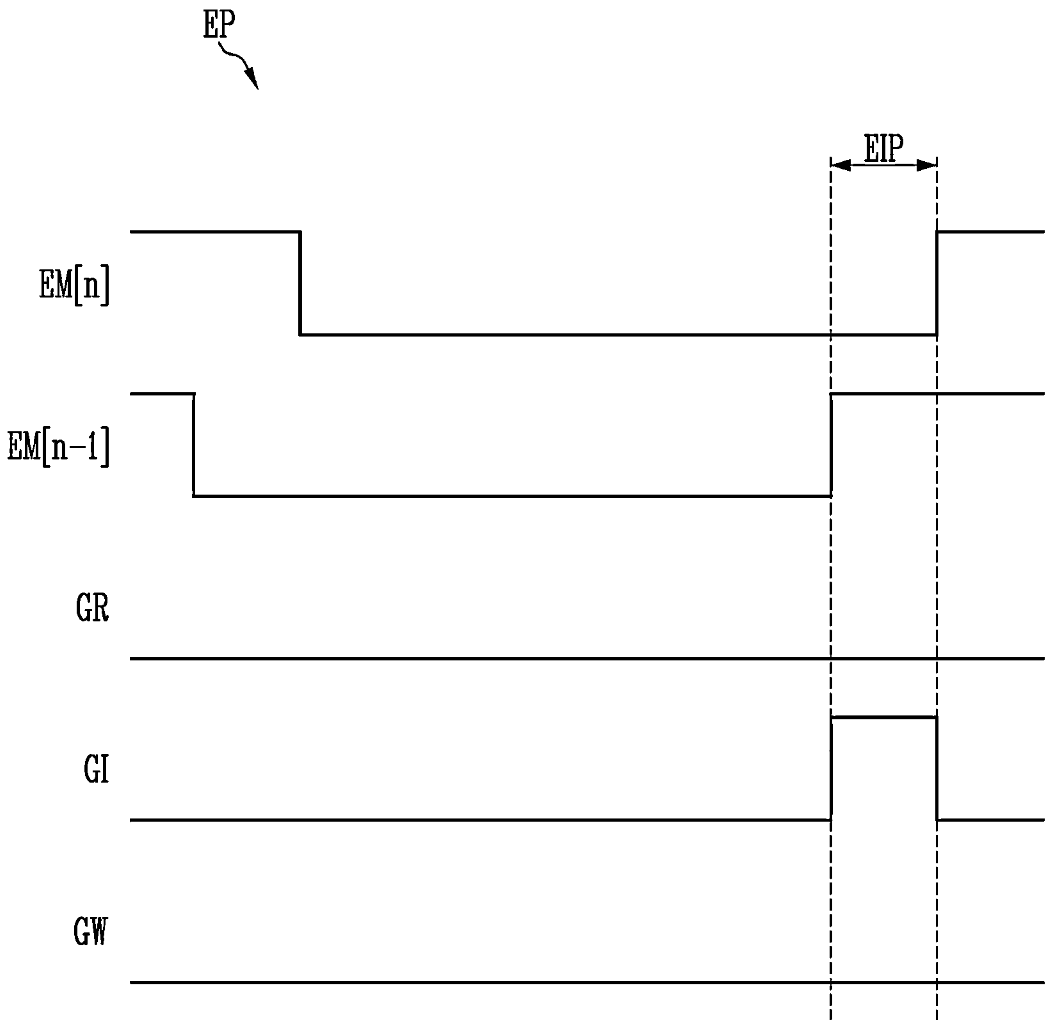
FIG. 21 is a timing diagram illustrating an example of driving the sub-pixel during an emission period in the display device of FIG. 19.

FIG. 19 is a circuit diagram illustrating a sub-pixel SP of the display device in accordance with embodiments of the present disclosure. FIG. 20 is a timing diagram illustrating an example of driving the sub-pixel SP during a non-emission period in the display device of FIG. 19. FIG. 21 is a timing diagram illustrating an example of driving the sub-pixel SP during an emission period in the display device of FIG. 19.

The configuration of the sub-pixel SP in accordance with the present embodiments is substantially the same as that of the sub-pixel SP of FIG. 16, other than fifth and seventh transistors T5 and T7; therefore, identical or similar components are denoted by the same reference numerals and symbols, and redundant explanation thereof will be omitted.

Referring to FIG. 19, the sub-pixel SP may further include the fifth transistor T5 configured to provide an initialization voltage VINT to the first electrode of the first transistor T1 in response to an initialization gate signal GI, and the seventh transistor T7 configured to connect the first electrode of the first transistor T1 to the first electrode of the light emitting element EE in response to a preceding emission signal EM[n−1].

The sub-pixel SP of FIG. 19 may be a sub-pixel SP provided on an n-th pixel row (where n is a positive integer). The preceding emission signal EM[n−1] may be an emission signal applied to the sixth transistor T6 of the sub-pixel SP provided on an n−1-th pixel row. In the present embodiment, an n−1-th pixel row has been illustrated, but the present disclosure is not limited thereto.

As such, the preceding emission signal EM[n−1] may be used in lieu of the emission bias signal EMB in FIG. 8, whereby the size and configuration of the emission driver 500 in FIG. 5 can be reduced. As a result, dead space may be reduced.

For example, the fifth transistor T5 may include a control electrode configured to receive the initialization gate signal GI, a first electrode configured to receive the initialization voltage VINT, and a second electrode connected to the second node N2. The seventh transistor T7 may include a control electrode configured to receive the preceding emission signal EM[n−1], a first electrode connected to the second node N2, and a second electrode connected to the first electrode of the light emitting element EE.

Each of the fifth and seventh transistors T5 and T7 may be implemented using an NMOS transistor. However, the present disclosure is not limited to the aforementioned example. For example, each of the fifth and seventh transistors T5 and T7 may be implemented using a PMOS transistor.

Referring to FIGS. 19 to 21, one frame may include a non-emission period NEP and an emission period EP. For example, the light emitting element EE may emit light during the emission period EP. The non-emission period NEP may include a first compensation initialization period ICP1, a second compensation initialization period ICP2, and an addressing period AP. The emission period EP may include an emission initialization period EIP.

In an embodiment, the first compensation initialization period ICP1 and the second compensation initialization period ICP2 may be alternately arranged. The second compensation initialization period ICP2 may be positioned immediately before the addressing period AP. In the present embodiment, there has been illustrated the case where the first compensation initialization period ICP1 and the second compensation initialization period ICP2 are repeated twice, but the present disclosure is not limited thereto.

For example, during the first compensation initialization period ICP1, the initialization gate signal GI may have an enable level, and the fifth transistor T5 may be turned on. Hence, the voltage of the second node N2 may be VINT.

For example, during the second compensation initialization period ICP2, the reference gate signal GR may have an enable level, and the third, fourth, and ninth transistors T3, T4, and T9 may be turned on. Hence, the voltage of the first node N1 may be VREF, and the voltage of each of the second and third nodes N2 and N3 may be VREF−VTH. In other words, because a voltage corresponding to VREF−VTH is stored in the first and second capacitors C1 and C2, the threshold voltage of the first transistor T1 may be compensated for during the emission period EP.

For example, in one frame, during the addressing period AP following the first compensation initialization period ICP1 and the second compensation initialization period ICP2, each of the initialization gate signal GI, the write gate signal GW, and the preceding emission signal EM[n−1] may have an enable level, and the second, fifth, and seventh transistors T2, T5, and T7 may be turned on. Hence, the voltage of the first node N1 may be VDATA+VTH, the voltage of the second node N2 may be VINT, and the voltage of the third node N3 may be VDATA. In other words, the data voltage VDATA may be written to the first and second capacitors C1 and C2.

For example, in one frame, during the emission initialization period EIP following the addressing period AP, each of the initialization gate signal GI and the preceding emission signal EM[n−1] may have an enable level, and the fifth and seventh transistors T5 and T7 may be turned on. In other words, the voltages of the second node N2 and the first electrode of the light emitting element EE may be initialized.

For example, during the emission period EP, the emission signal EM[n] and the preceding emission signal EM[n−1] may periodically have an enable level and a disable level. While the emission signal E [n] and the preceding emission signal EM[n−1] have an enable level, the sixth and seventh transistors T6 and T7 may be turned on. The first transistor T1 may generate driving current corresponding to a gate-source voltage (i.e., a voltage between the first node N1 and the second node N2). The gate-source voltage of the first transistor T1 may be VDATA−VINT+VTH.

Figure 22:
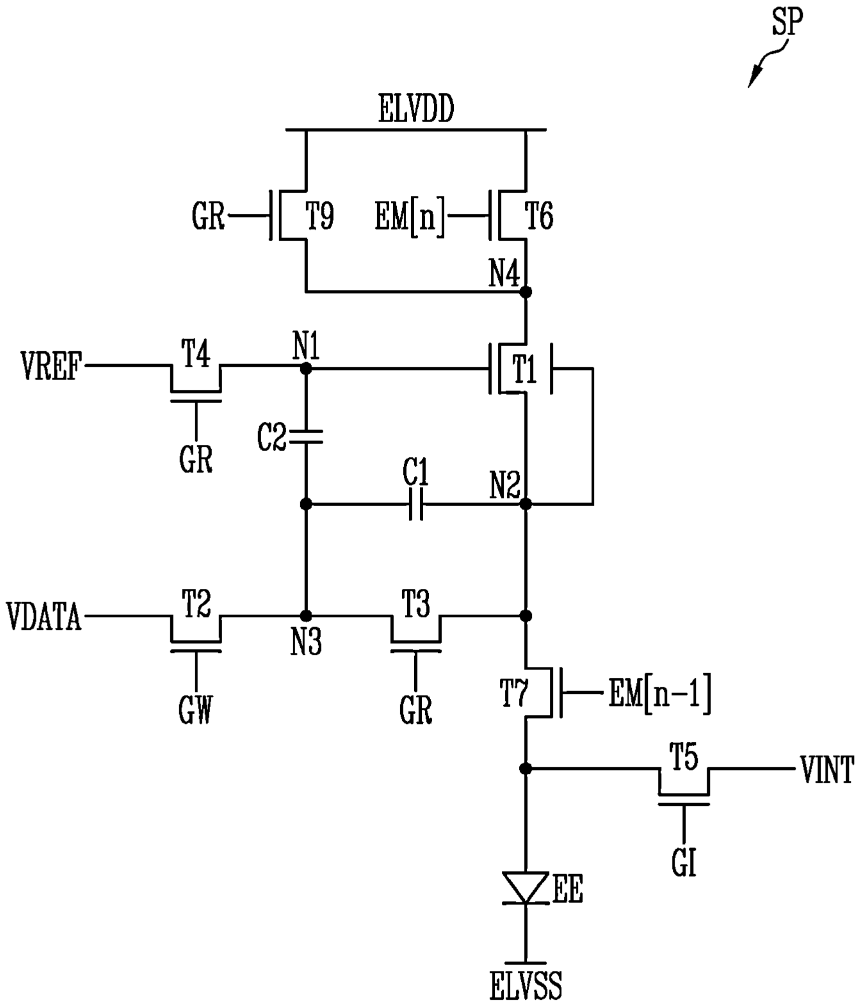
FIG. 22 is a circuit diagram illustrating a sub-pixel of the display device in accordance with embodiments of the present disclosure.

FIG. 22 is a circuit diagram illustrating a sub-pixel SP of the display device in accordance with embodiments of the present disclosure.

The configuration of the sub-pixel SP in accordance with the present embodiments is substantially the same as that of the sub-pixel SP of FIG. 19, other than a seventh transistor T7; therefore, identical or similar components are denoted by the same reference numerals and symbols, and redundant explanation thereof will be omitted.

Referring to FIG. 22, the sub-pixel SP may further include the seventh transistor T7 configured to connect the first electrode of the first transistor T1 to the first electrode of the light emitting element EE in response to a preceding emission bias signal EM[n−1]. The display device in FIG. 22 may drive the sub-pixel SP in a manner substantially identical to that of FIGS. 20 and 21; therefore, redundant explanations will be omitted.

Figure 23:
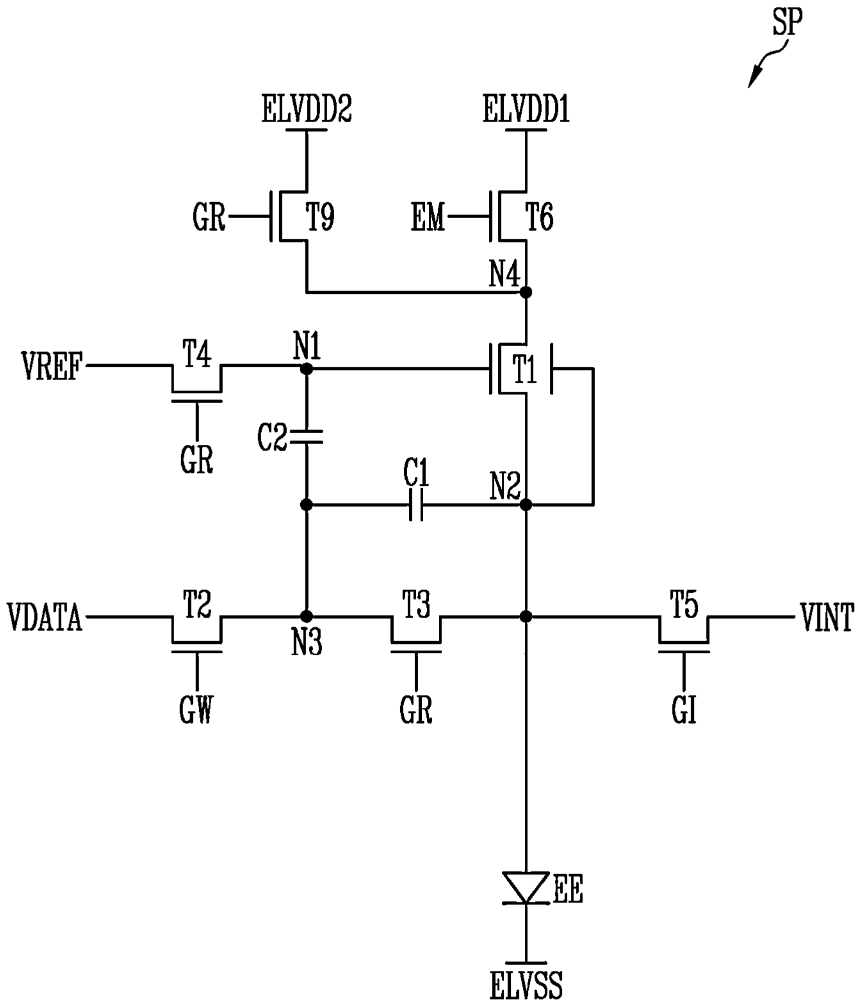
FIG. 23 is a circuit diagram illustrating a sub-pixel of the display device in accordance with embodiments of the present disclosure.

FIG. 23 is a circuit diagram illustrating a sub-pixel SP of the display device in accordance with embodiments of the present disclosure.

The configuration of the sub-pixel SP in accordance with the present embodiments is substantially the same as that of the sub-pixel SP of FIG. 16, other than a 1-1-th power voltage ELVDD1 and a 1-2-th power voltage ELVDD2; therefore, identical or similar components are denoted by the same reference numerals and symbols, and redundant explanation thereof will be omitted.

Referring to FIG. 23, the sub-pixel SP may include a sixth transistor T6 configured to provide the 1-1-th power voltage ELVDD1 to the first transistor T1 in response to an emission signal EM, and a ninth transistor T9 configured to provide the 1-2-th power voltage ELVDD2 to the first transistor T1 in response to a reference gate signal GR.

For example, the sixth transistor T6 may include a control electrode configured to receive the emission signal EM, a first electrode configured to receive the 1-1-th power voltage ELVDD1, and a second electrode connected to the fourth node N4. The ninth transistor T9 may include a control electrode configured to receive the reference gate signal GR, a first electrode configured to receive the 1-2-th power voltage ELVDD2, and a second electrode connected to the fourth node N4.

In an embodiment, the 1-1-th power voltage ELVDD1 and the 1-2-th power voltage ELVDD2 may be applied to the display panel through different lines. For example, the 1-1-th power voltage ELVDD1 may be used to emit light, and the 1-2-th power voltage ELVDD2 may be used to compensate for the threshold voltage.

However, it is not necessary for the voltage values of the 1-1-th power voltage ELVDD1 and the 1-2-th power voltage ELVDD2 to be different from each other. The influence between the sub-pixels SP may be minimized by dividing the first power voltage ELVDD in FIG. 16 into the 1-1-th power voltage ELVDD1 and the 1-2-th power voltage ELVDD2.

Dividing the first power voltage ELVDD in FIG. 16 into the 1-1-th power voltage ELVDD1 and the 1-2-th power voltage ELVDD2 may also be applied to the sub-pixels SP of FIGS. 19 and 22.

The display device in FIG. 23 may drive the sub-pixel SP in a manner substantially identical to that of FIG. 17; therefore, redundant explanations will be omitted.

Figure 24:
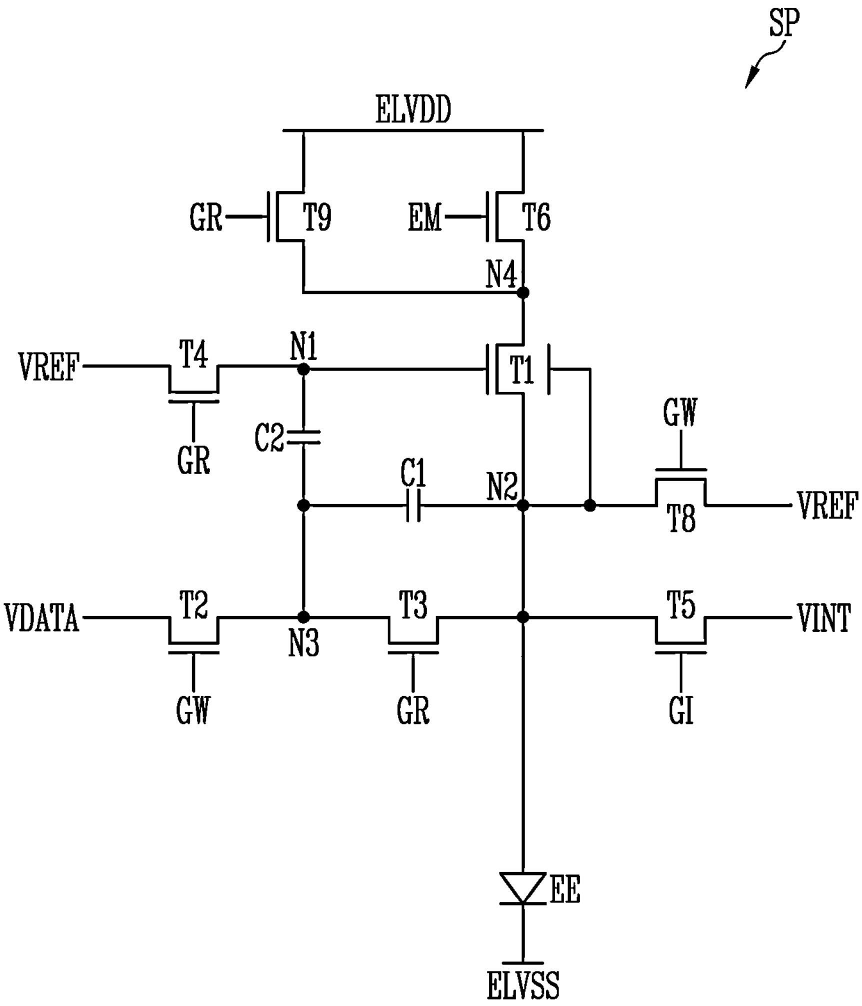
FIG. 24 is a circuit diagram illustrating a sub-pixel of the display device in accordance with embodiments of the present disclosure.
Figure 25:
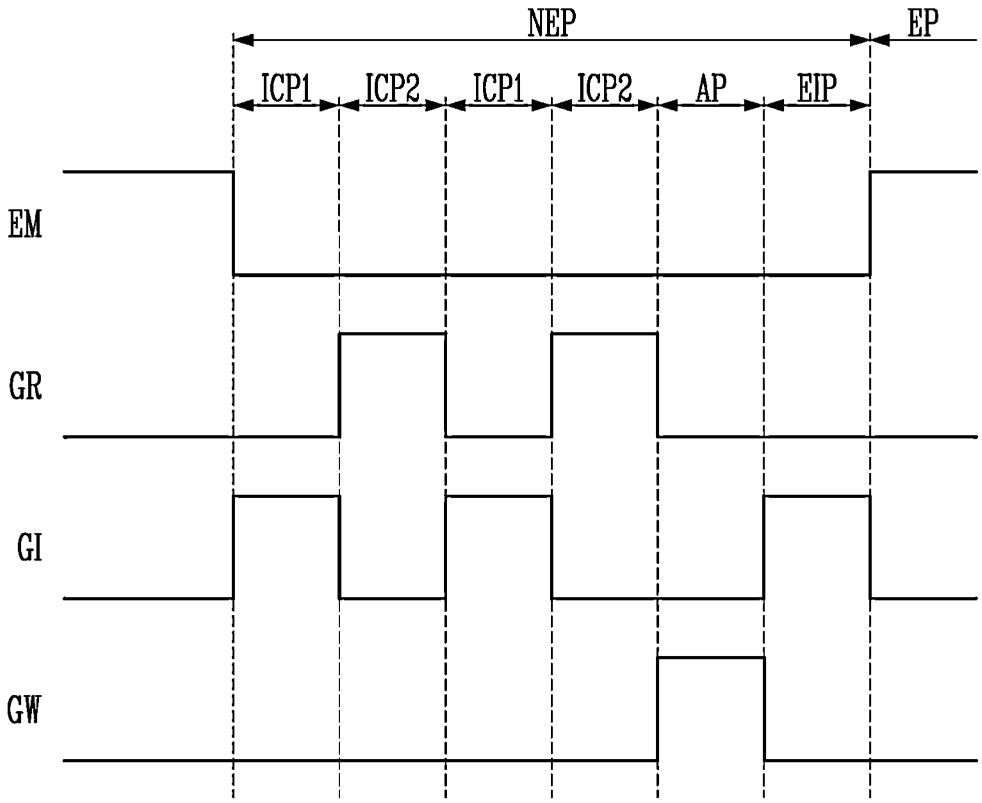
FIG. 25 is a timing diagram illustrating an example of driving the sub-pixel in the display device of FIG. 24.

FIG. 24 is a circuit diagram illustrating a sub-pixel SP of the display device in accordance with embodiments of the present disclosure. FIG. 25 is a timing diagram illustrating an example of driving the sub-pixel SP in the display device of FIG. 24.

The configuration of the sub-pixel SP in accordance with the present embodiments is substantially the same as that of the sub-pixel SP of FIG. 16, other than an eighth transistor T8; therefore, identical or similar components are denoted by the same reference numerals and symbols, and redundant explanation thereof will be omitted.

Referring to FIG. 24, the sub-pixel SP may further include the eighth transistor T8 configured to provide a reference voltage VREF to the first electrode of the first transistor T1 in response to a write gate signal GW.

For example, the eighth transistor T8 may include a control electrode configured to receive the write gate signal GW, a first electrode configured to receive the reference voltage VREF, and a second electrode connected to the second node N2.

The eighth transistor T8 may be implemented using an NMOS transistor. However, the present disclosure is not limited to the aforementioned example. The eighth transistor T8 may be implemented using a PMOS transistor.

Referring to FIGS. 24 to 25, one frame may include a non-emission period NEP and an emission period EP. For example, the light emitting element EE may emit light during the emission period EP. The non-emission period NEP may include a first compensation initialization period ICP1, a second compensation initialization period ICP2, an addressing period AP, and an emission initialization period EIP.

In an embodiment, the first compensation initialization period ICP1 and the second compensation initialization period ICP2 may be alternately arranged. The second compensation initialization period ICP2 may be positioned immediately before the addressing period AP. In the present embodiment, there has been illustrated the case where the first compensation initialization period ICP1 and the second compensation initialization period ICP2 are repeated twice, but the present disclosure is not limited thereto.

For example, during the first compensation initialization period ICP1, the initialization gate signal GI may have an enable level, and the fifth transistor T5 may be turned on. Hence, the voltage of the second node N2 may be VINT.

For example, during the second compensation initialization period ICP2, the reference gate signal GR may have an enable level, and the third, fourth, and ninth transistors T3, T4, and T9 may be turned on. Hence, the voltage of the first node N1 may be VREF, and the voltage of each of the second and third nodes N2 and N3 may be VREF−VTH. In other words, because a voltage corresponding to VREF−VTH is stored in the first and second capacitors C1 and C2, the threshold voltage of the first transistor T1 may be compensated for during the emission period EP.

For example, in one frame, during the addressing period AP following the first compensation initialization period ICP1 and the second compensation initialization period ICP2, the write gate signal GW may have an enable level, and the second and eighth transistors T2 and T8 may be turned on. Hence, the voltage of the first node N1 may be VDATA+VTH, the voltage of the second node N2 may be VREF, and the voltage of the third node N3 may be VDATA. In other words, the data voltage VDATA may be written to the first and second capacitors C1 and C2.

For example, in one frame, during the emission initialization period EIP following the addressing period AP, the initialization gate signal GI may have an enable level, and the fifth transistor T5 may be turned on. In other words, the voltage of the second node N2 may be initialized.

For example, during the emission period EP, the emission signal EM may have an enable level, and the sixth transistor T6 may be turned on. The first transistor T1 may generate driving current corresponding to a gate-source voltage (i.e., a voltage between the first node N1 and the second node N2). The gate-source voltage of the first transistor T1 may be VDATA−VREF+VTH.

Figure 26:
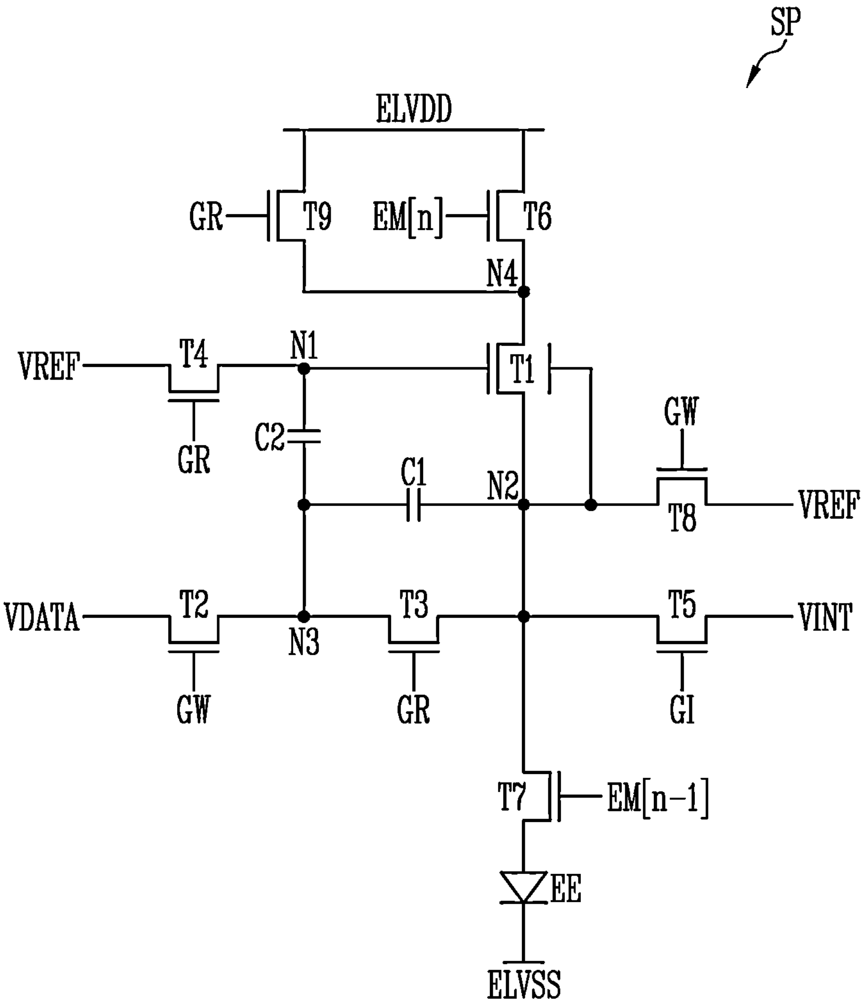
FIG. 26 is a circuit diagram illustrating a sub-pixel of the display device in accordance with embodiments of the present disclosure.
Figure 27:
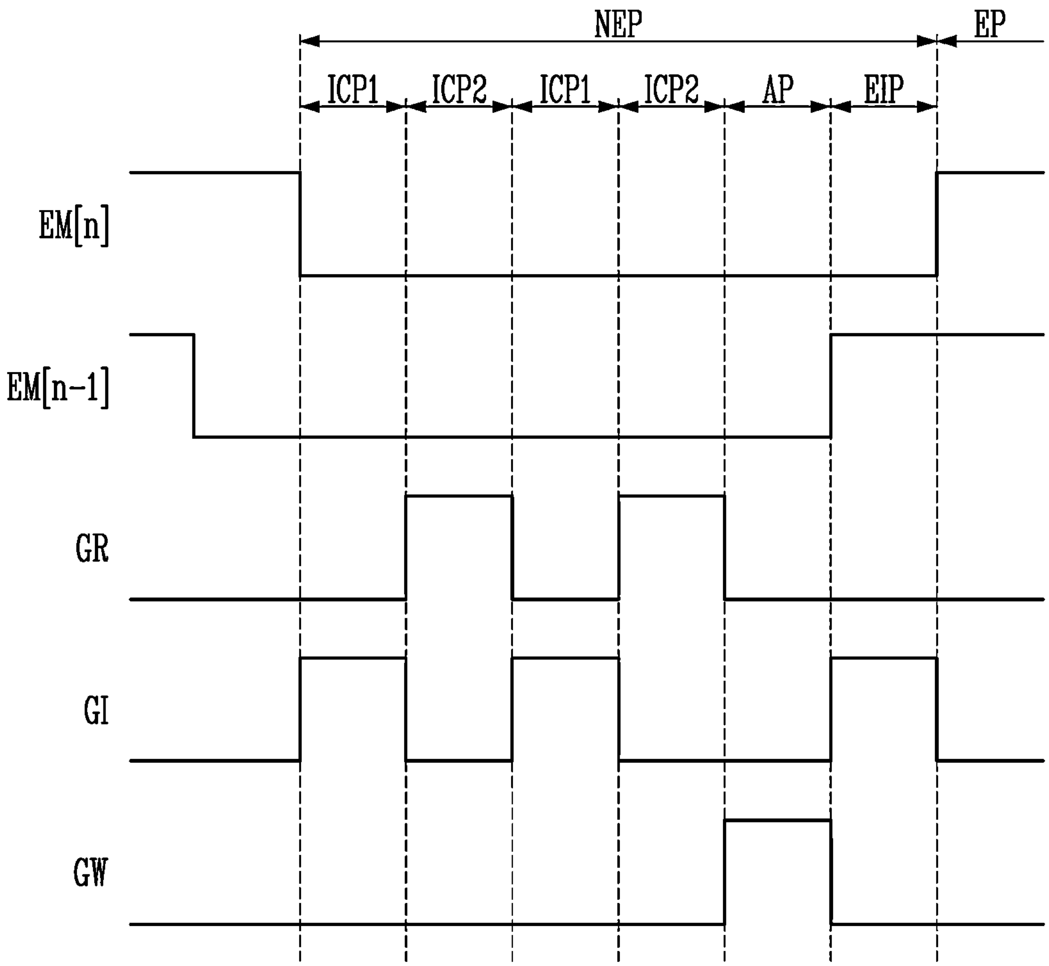
FIG. 27 is a timing diagram illustrating an example of driving the sub-pixel in the display device of FIG. 26.

FIG. 26 is a circuit diagram illustrating a sub-pixel SP of the display device in accordance with embodiments of the present disclosure. FIG. 27 is a timing diagram illustrating an example of driving the sub-pixel SP in the display device of FIG. 26.

The configuration of the sub-pixel SP in accordance with the present embodiments is substantially the same as that of the sub-pixel SP of FIG. 24, other than fifth and seventh transistors T5 and T7; therefore, identical or similar components are denoted by the same reference numerals and symbols, and redundant explanation thereof will be omitted.

Referring to FIG. 26, the sub-pixel SP may further include the fifth transistor T5 configured to provide an initialization voltage VINT to the first electrode of the first transistor T1 in response to an initialization gate signal GI, and the seventh transistor T7 configured to connect the first electrode of the first transistor T1 to the first electrode of the light emitting element EE in response to a preceding emission signal EM[n−1].

For example, the fifth transistor T5 may include a control electrode configured to receive the initialization gate signal GI, a first electrode configured to receive the initialization voltage VINT, and a second electrode connected to the second node N2. The seventh transistor T7 may include a control electrode configured to receive the preceding emission signal EM[n−1], a first electrode connected to the second node N2, and a second electrode connected to the first electrode of the light emitting element EE.

Each of the fifth and seventh transistors T5 and T7 may be implemented using an NMOS transistor. However, the present disclosure is not limited to the aforementioned example. For example, each of the fifth and seventh transistors T5 and T7 may be implemented using a PMOS transistor.

Referring to FIGS. 26 and 27, one frame may include a non-emission period NEP and an emission period EP. For example, the light emitting element EE may emit light during the emission period EP. The non-emission period NEP may include a first compensation initialization period ICP1, a second compensation initialization period ICP2, an addressing period AP, and an emission initialization period EIP.

In an embodiment, the first compensation initialization period ICP1 and the second compensation initialization period ICP2 may be alternately arranged. The second compensation initialization period ICP2 may be positioned immediately before the addressing period AP. In the present embodiment, there has been illustrated the case where the first compensation initialization period ICP1 and the second compensation initialization period ICP2 are repeated twice, but the present disclosure is not limited thereto.

For example, during the first compensation initialization period ICP1, the initialization gate signal GI may have an enable level, and the fifth transistor T5 may be turned on. Hence, the voltage of the second node N2 may be VINT.

For example, during the second compensation initialization period ICP2, the reference gate signal GR may have an enable level, and the third, fourth, and ninth transistors T3, T4, and T9 may be turned on. Hence, the voltage of the first node N1 may be VREF, and the voltage of each of the second and third nodes N2 and N3 may be VREF−VTH. In other words, because a voltage corresponding to VREF−VTH is stored in the first and second capacitors C1 and C2, the threshold voltage of the first transistor T1 may be compensated for during the emission period EP.

For example, in one frame, during the addressing period AP following the first compensation initialization period ICP1 and the second compensation initialization period ICP2, the write gate signal GW may have an enable level, and the second and eighth transistors T2 and T8 may be turned on. Hence, the voltage of the first node N1 may be VDATA+VTH, the voltage of the second node N2 may be VREF, and the voltage of the third node N3 may be VDATA. In other words, the data voltage VDATA may be written to the first and second capacitors C1 and C2.

For example, in one frame, during the emission initialization period EIP following the addressing period AP, each of the initialization gate signal GI and the preceding emission signal EM[n−1] may have an enable level, and the fifth and seventh transistors T5 and T7 may be turned on. In other words, the voltages of the second node N2 and the first electrode of the light emitting element EE may be initialized.

For example, during the emission period EP, each of the emission signal EM[n] and the preceding emission signal EM[n−1] may have an enable level, and the sixth and seventh transistors T6 and T7 may be turned on. The first transistor T1 may generate driving current corresponding to a gate-source voltage (i.e., a voltage between the first node N1 and the second node N2). The gate-source voltage of the first transistor T1 may be VDATA−VREF+VTH.

Figure 28:
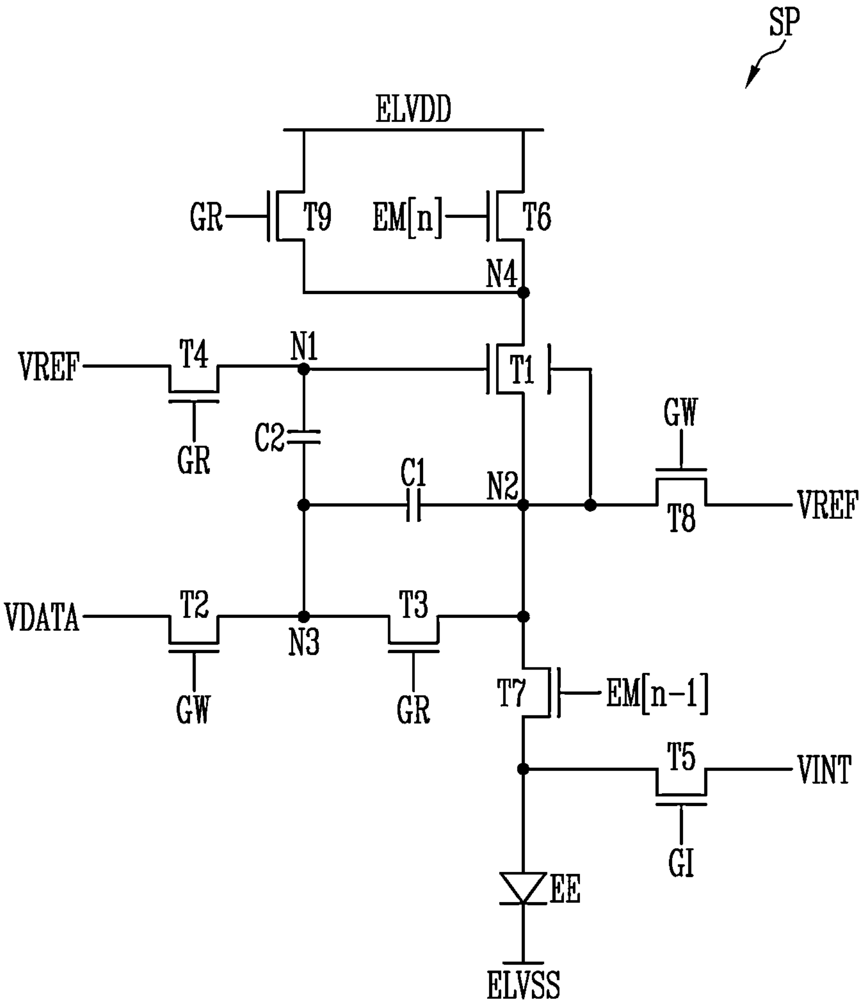
FIG. 28 is a circuit diagram illustrating a sub-pixel of the display device in accordance with embodiments of the present disclosure.

FIG. 28 is a circuit diagram illustrating a sub-pixel SP of the display device in accordance with embodiments of the present disclosure.

The configuration of the sub-pixel SP in accordance with the present embodiments is substantially the same as that of the sub-pixel SP of FIG. 24, other than a seventh transistor T7; therefore, identical or similar components are denoted by the same reference numerals and symbols, and redundant explanation thereof will be omitted.

Referring to FIG. 28, the sub-pixel SP may further include the seventh transistor T7 configured to connect the first electrode of the first transistor T1 to the first electrode of the light emitting element EE in response to a preceding emission bias signal EM[n−1]. The display device in FIG. 28 may drive the sub-pixel SP in a manner substantially identical to that of FIG. 27; therefore, redundant explanations will be omitted.

Figure 29:
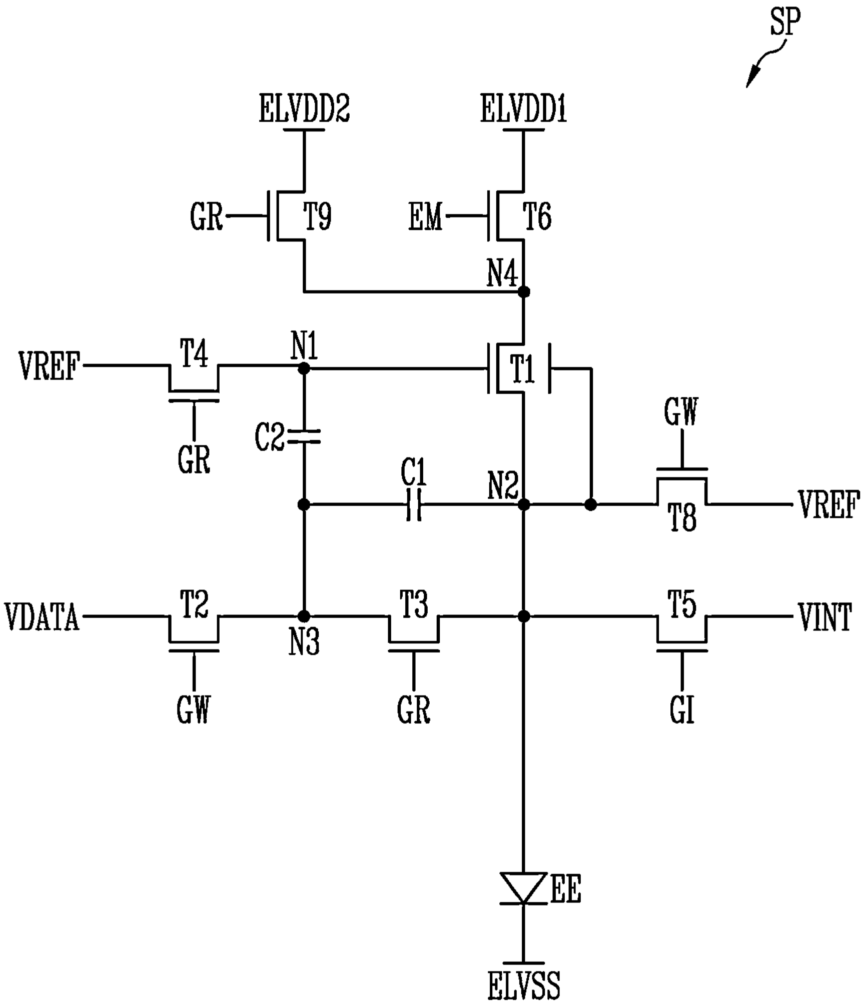
FIG. 29 is a circuit diagram illustrating a sub-pixel of the display device in accordance with embodiments of the present disclosure.

FIG. 29 is a circuit diagram illustrating a sub-pixel SP of the display device in accordance with embodiments of the present disclosure.

The configuration of the sub-pixel SP in accordance with the present embodiments is substantially the same as that of the sub-pixel SP of FIG. 24, other than a 1-1-th power voltage ELVDD1 and a 1-2-th power voltage ELVDD2; therefore, identical or similar components are denoted by the same reference numerals and symbols, and redundant explanation thereof will be omitted.

Referring to FIG. 29, the sub-pixel SP may include a sixth transistor T6 configured to provide the 1-1-th power voltage ELVDD1 to the first transistor T1 in response to an emission signal EM, and a ninth transistor T9 configured to provide the 1-2-th power voltage ELVDD2 to the first transistor T1 in response to a reference gate signal GR.

For example, the sixth transistor T6 may include a control electrode configured to receive the emission signal EM, a first electrode configured to receive the 1-1-th power voltage ELVDD1, and a second electrode connected to the fourth node N4. The ninth transistor T9 may include a control electrode configured to receive the reference gate signal GR, a first electrode configured to receive the 1-2-th power voltage ELVDD2, and a second electrode connected to the fourth node N4.

In an embodiment, the 1-1-th power voltage ELVDD1 and the 1-2-th power voltage ELVDD2 may be applied to the display panel through different lines. For example, the 1-1-th power voltage ELVDD1 may be used to emit light, and the 1-2-th power voltage ELVDD2 may be used to compensate for the threshold voltage.

However, it is not necessary for the voltage values of the 1-1-th power voltage ELVDD1 and the 1-2-th power voltage ELVDD2 to be different from each other. The influence between the sub-pixels SP may be minimized by dividing the first power voltage ELVDD in FIG. 24 into the 1-1-th power voltage ELVDD1 and the 1-2-th power voltage ELVDD2.

Dividing the first power voltage ELVDD in FIG. 24 into the 1-1-th power voltage ELVDD1 and the 1-2-th power voltage ELVDD2 may also be applied to the sub-pixels SP of FIGS. 26 and 28.

The display device in FIG. 29 may drive the sub-pixel SP in a manner substantially identical to that of FIG. 25; therefore, redundant explanations will be omitted.

Figure 30:
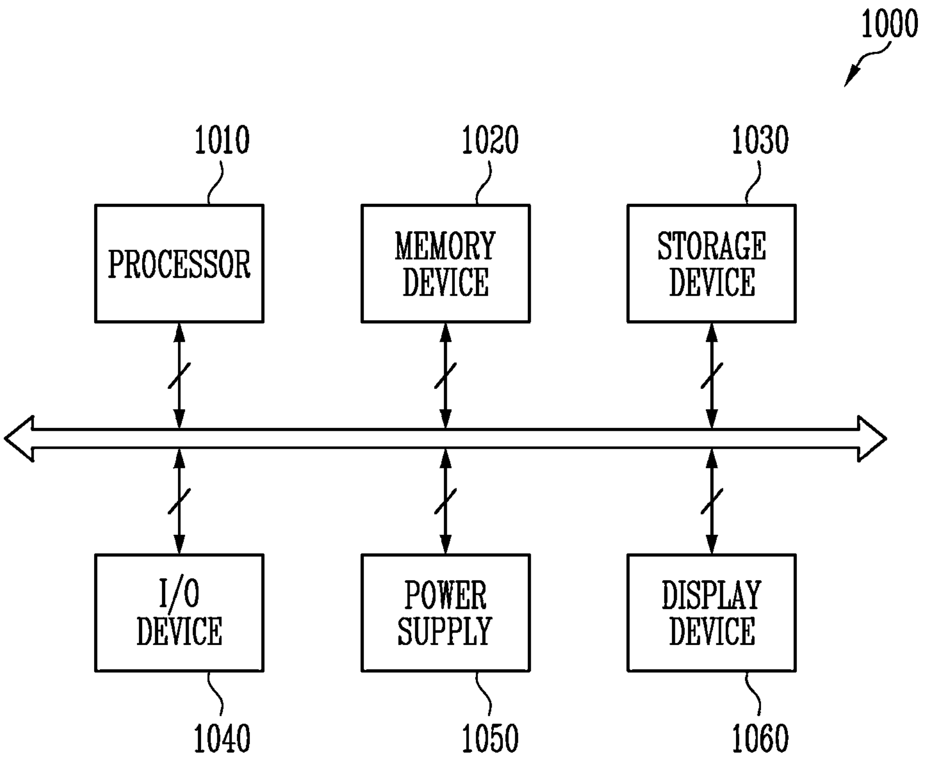
FIG. 30 is a block diagram illustrating an electronic device in accordance with embodiments of the present disclosure.
Figure 31:
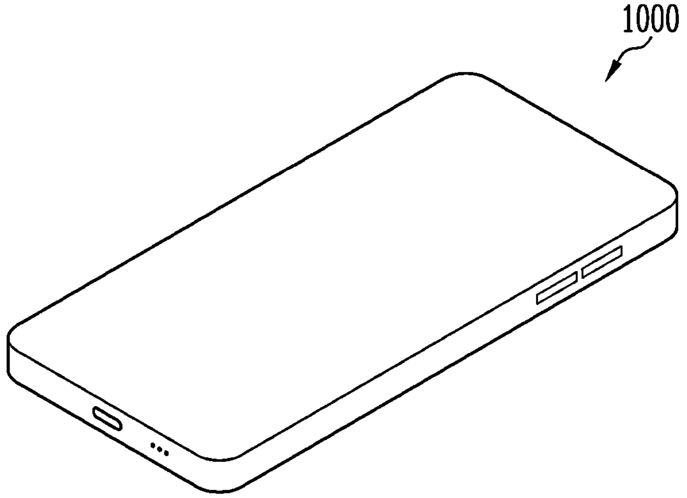
FIG. 31 is a diagram illustrating an example where the electronic device of FIG. 30 is implemented as a smartphone.

FIG. 30 is a block diagram illustrating an electronic device 1000 in accordance with embodiments of the present disclosure. FIG. 31 is a diagram illustrating an example where the electronic device 1000 of FIG. 30 is implemented as a smartphone.

Referring to FIGS. 30 to 31, the electronic device 1000 may include a processor 1010, a memory device 1020, a storage device 1030, an input/output (I/O) device 1040, a power supply 1050, and a display device 1060. The display device 1060 may be the display device of FIG. 1. The electronic device 1000 may further include various ports for communication with a video card, a sound card, a memory card, a USB device, or other systems. In an embodiment, as illustrated in FIG. 31, the electronic device 1000 may be implemented as a smartphone. However, the aforementioned examples are illustrative, and the electronic device 1000 is not limited to the aforementioned examples. For example, the electronic device 1000 may be implemented as a cellular phone, a video phone, a smartpad, a smartwatch, a tablet PC, a navigation device for vehicles, a computer monitor, a laptop computer, a head-mounted display device, and so on.

The processor 1010 may perform specific calculations or tasks. In an embodiment, the processor 1010 may be a micro processor, a central processing unit, an application processor, or the like. The processor 1010 may be connected to other components through an address bus, a control bus, a data bus, and the like. In an embodiment, the processor 1010 may be connected to an expansion bus such as a peripheral component interconnect (PCI) bus.

The memory device 1020 may store data needed to perform the operation of the electronic device 1000. For example, the memory device 1020 may include non-volatile memory devices such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, and a ferroelectric random access memory (FRAM) device, and/or volatile memory devices such as a dynamic random access memory (DRAM) device, a static random access memory (SRAM) device, a mobile DRAM device, and so on.

The storage device 1030 may include a solid state drive (SSD), a hard disk drive (HDD), a CD-ROM, or the like.

The I/O device 1040 may include input devices such as a keyboard, a keypad, a touchpad, a touch screen, and a mouse, and output devices such as a speaker and a printer. In an embodiment, the display device 1060 may be included in the I/O device 1040.

The power supply 1050 may supply power needed to perform the operation of the electronic device 1000. For example, the power supply 1050 may be a power management integrated circuit (PMIC).

The display device 1060 may display an image corresponding to visual information of the electronic device 1000. Here, the display device 1060 may be an organic light emitting display device or a quantum dot light emitting display device, but is not limited thereto. The display device 1060 may be connected to other components through the buses or other communication links.

In a sub-pixel in accordance with embodiments of the present disclosure, an unaltered data voltage rather than a reduced data voltage, e.g., (1-α)*VDATA, where α is a real number less than 1 and greater than 0, may be written. Hence, a range of the data voltage to be applied to the sub-pixel may be reduced, and the power consumption of a display device including the sub-pixel can be reduced.

However, effects of the present disclosure are not limited to the above-described effects, and various modifications are possible without departing from the spirit and scope of the present disclosure.

The present disclosure may be applied to a display device and an electronic device including the display device. For example, the present disclosure may be applied to digital TVs, 3D TVs, cellular phones, smartphones, tablet computers, VR devices, PCs, home appliances, laptop computers, PDAs, portable media players (PMPs), digital cameras, music players, portable game consoles, navigation devices, and so on.

While embodiments have been described above, those skilled in the art will appreciate that various modifications, additions and substitutions are possible, without departing from the scope and spirit of the present disclosure claimed in the appended claims.

What is claimed is:

1. A sub-pixel, comprising:

a first transistor configured to generate a driving current;

a first capacitor including a first electrode connected to a first electrode of the first transistor, and a second electrode;

a second capacitor including a first electrode connected to a control electrode of the first transistor, and a second electrode connected to the second electrode of the first capacitor;

a second transistor configured to provide a data voltage to the second electrode of the first capacitor in response to a write gate signal;

a light emitting element configured to receive the driving current and emit light;

a third transistor configured to connect the first electrode of the first transistor to the second electrode of the first capacitor in response to a reference gate signal;

a fourth transistor configured to provide a reference voltage to the control electrode of the first transistor in response to the reference gate signal; and a fifth transistor configured to provide an initialization voltage to a first electrode of the light emitting element in response to an initialization gate signal, wherein each of the reference gate signal and the initialization gate signal has an enable level during an initialization period, wherein the reference gate signal has the enable level during a compensation period following the initialization period in one frame, wherein each of the initialization gate signal and the write gate signal has the enable level during an addressing period following the compensation period in one frame, and wherein the initialization gate signal has the enable level during an emission initialization period following the addressing period in one frame.

2. The sub-pixel according to claim 1, further comprising a sixth transistor configured to provide a first power voltage to the first transistor in response to an emission signal.

3. The sub-pixel according to claim 2, wherein the emission signal has the enable level during the compensation period.

4. The sub-pixel according to claim 2, further comprising a seventh transistor configured to connect the first electrode of the first transistor to the first electrode of the light emitting element in response to an emission bias signal.

5. The sub-pixel according to claim 2, further comprising an eighth transistor configured to provide the reference voltage to the first electrode of the first transistor in response to the write gate signal.

6. The sub-pixel according to claim 5, wherein the emission signal has the enable level during the compensation period.

7. The sub-pixel according to claim 5, further comprising a seventh transistor configured to connect the first electrode of the first transistor to the first electrode of the light emitting element in response to an emission bias signal.

8. The sub-pixel according to claim 1, further comprising:

a sixth transistor configured to provide a first power voltage to the first transistor in response to an emission signal; and a seventh transistor configured to connect the first electrode of the first transistor to the first electrode of the light emitting element in response to an emission bias signal.

9. The sub-pixel according to claim 8, further comprising an eighth transistor configured to provide the reference voltage to the first electrode of the first transistor in response to the write gate signal.

10. The sub-pixel according to claim 9, wherein the emission signal has the enable level during the compensation period, and wherein the emission bias signal has the enable level during the emission initialization period.

11. A sub-pixel, comprising:

a first transistor configured to generate a driving current;

a first capacitor including a first electrode connected to a first electrode of the first transistor, and a second electrode;

a second capacitor including a first electrode connected to a control electrode of the first transistor, and a second electrode connected to the second electrode of the first capacitor;

a second transistor configured to provide a data voltage to the second electrode of the first capacitor in response to a write gate signal;

a light emitting element configured to receive the driving current and emit light;

a third transistor configured to connect the first electrode of the first transistor to the second electrode of the first capacitor in response to a reference gate signal;

a fourth transistor configured to provide a reference voltage to the control electrode of the first transistor in response to the reference gate signal;

a fifth transistor configured to provide an initialization voltage to the first electrode of the first transistor in response to an initialization gate signal;

a sixth transistor configured to provide a first power voltage to the first transistor in response to an emission signal; and a seventh transistor configured to connect the first electrode of the first transistor to a first electrode of the light emitting element in response to an emission bias signal, wherein each of the reference gate signal and the initialization gate signal has an enable level during an initialization period, wherein each of the reference gate signal and the emission signal has the enable level during a compensation period following the initialization period in one frame, wherein each of the initialization gate signal, the write gate signal, and the emission bias signal has the enable level during an addressing period following the compensation period in one frame, and wherein each of the initialization gate signal and the emission bias signal has the enable level during an emission initialization period following the addressing period in one frame.

12. A display device, comprising:

a display panel including a sub-pixel; and a display panel driver configured to drive the display panel, wherein the sub-pixel comprises:

a first transistor configured to generate a driving current;

a first capacitor including a first electrode connected to a first electrode of the first transistor, and a second electrode;

a second capacitor including a first electrode connected to a control electrode of the first transistor, and a second electrode connected to the second electrode of the first capacitor;

a second transistor configured to provide a data voltage to the second electrode of the first capacitor in response to a write gate signal;

a light emitting element configured to receive the driving current and emit light;

a third transistor configured to connect the first electrode of the first transistor to the second electrode of the first capacitor in response to a reference gate signal;

a fourth transistor configured to provide a reference voltage to the control electrode of the first transistor in response to the reference gate signal; and a fifth transistor configured to provide an initialization voltage to a first electrode of the light emitting element in response to an initialization gate signal, wherein each of the reference gate signal and the initialization gate signal has an enable level during an initialization period, wherein the reference gate signal has the enable level during a compensation period following the initialization period in one frame, wherein each of the initialization gate signal and the write gate signal has the enable level during an addressing period following the compensation period in one frame, and wherein the initialization gate signal has the enable level during an emission initialization period following the addressing period in one frame.

* * * * *